(12) United States Patent
Nagao

(10) Patent No.: US 6,667,815 B1
(45) Date of Patent: Dec. 23, 2003

(54) METHOD AND APPARATUS FOR PROCESSING IMAGES

(75) Inventor: Kimitoshi Nagao, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/393,364

(22) Filed: Sep. 10, 1999

(30) Foreign Application Priority Data

Sep. 30, 1998 (JP) ............................................ 10-278351
Sep. 30, 1998 (JP) ............................................ 10-278355

(51) Int. Cl.[7] .......................... H04N 1/409; H04N 1/58; G06T 5/00
(52) U.S. Cl. ...................... 358/1.9; 358/3.26; 358/3.27; 382/266; 382/275
(58) Field of Search ............................... 358/1.9, 3.26, 358/3.27, 530, 532; 382/254, 261, 263, 264, 275, 266

(56) References Cited

U.S. PATENT DOCUMENTS

| 5,220,624 A | * | 6/1993 | Sakamoto et al. | ........... 382/266 |
| 6,055,340 A | * | 4/2000 | Nagao | ......................... 382/261 |
| 6,373,992 B1 | * | 4/2002 | Nagao | ......................... 382/266 |
| 6,445,831 B1 | * | 9/2002 | Arai | ............................ 382/254 |

FOREIGN PATENT DOCUMENTS

| EP | 0 800 114 | 10/1997 | ............ G03C/8/40 |
| JP | 9-258402 | 10/1997 | ............ G03C/8/40 |

OTHER PUBLICATIONS

Takafumi Noguchi, "Relating Granularity to Graininess", Journal of the Society of Photographic Science and Technology of Japan, 57(6), 415 (1994).

* cited by examiner

*Primary Examiner*—Scott Rogers
(74) *Attorney, Agent, or Firm*—Sughrue Mion, PLLC

(57) ABSTRACT

According to the method and apparatus of processing a digital image for noise suppression and sharpness enhancement, sharpness enhancement and smoothing are performed on an original image to obtain a sharpness enhanced image and a smoothed image, from which image data containing subject image edges and noise (graininess) is determined; edge detection is performed from the original image to determine weighting data for a noise (or grainy) region, which is multiplied by the above image data to determined noise (grain) data of each color in a noise region, from which a black-and-white noise (grain) component and a color noise (dye grain) component are discriminated and separated based on a color correlation component obtained by calculating a color correlation or an obtained local grain coefficient representing a spatial magnitude and a variation magnitude of density variations due to graininess; the thus obtained black-and-white noise component and color noise component are multiplied by their suppressing coefficients to determine a black-and-white noise suppressing component and a color noise suppressing component, which are selectively removed from the sharpness enhanced image data, whereupon a processed image in which the noise suppression is achieved while retaining the sharpness enhancement in the edge region of the image is created. Consequently, graininess can be suppressed while enhancing image sharpness, without causing the unnatural artifacts which may be produced by the discoptinuousness of the boundary between a region from which graininess has been removed and a region where sharpness enhancement has been done.

17 Claims, 4 Drawing Sheets

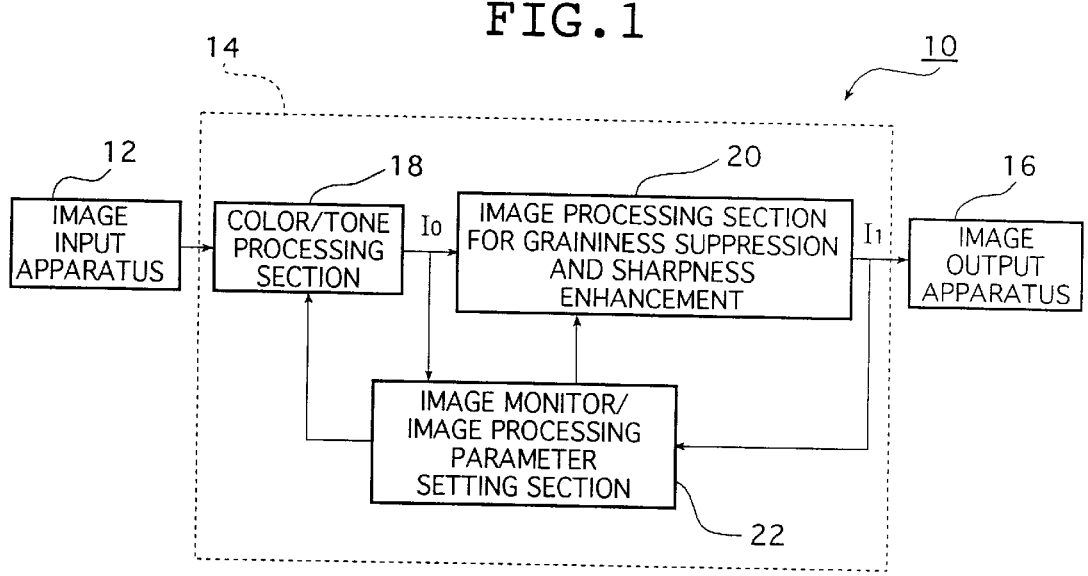
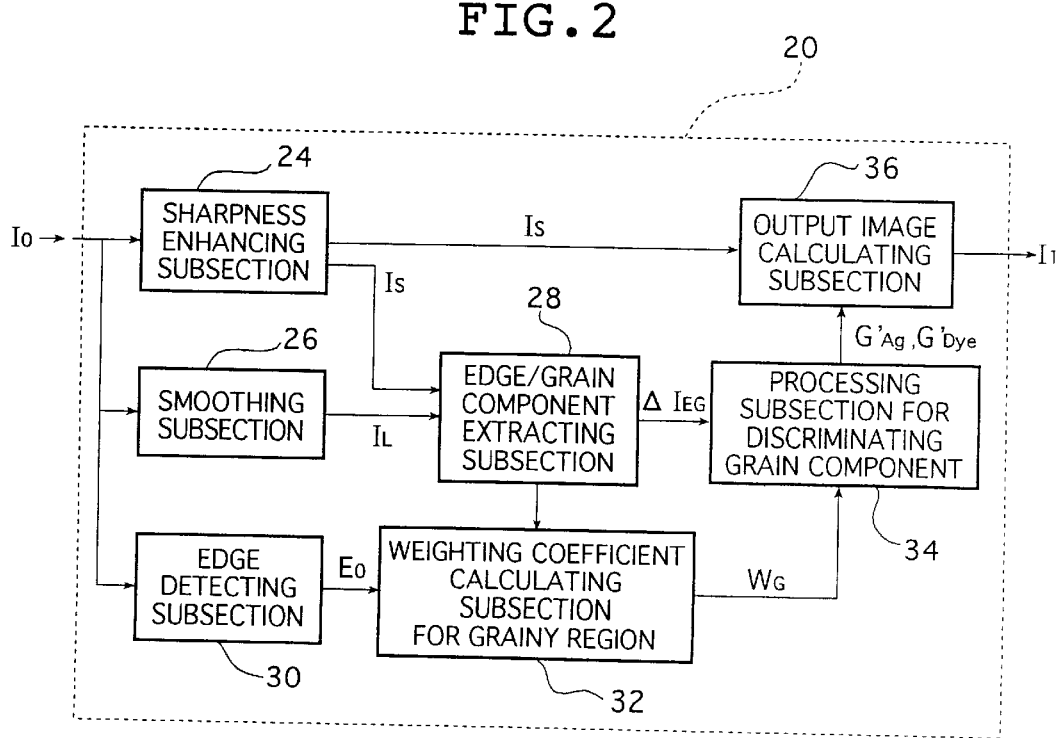

FIG.4A  $G_{OR}$  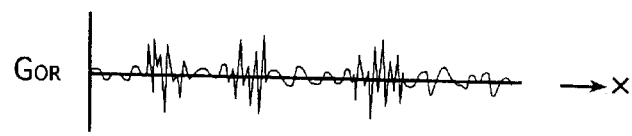
FIG.4B  $G_{OG}$  
FIG.4C  $G_{OB}$  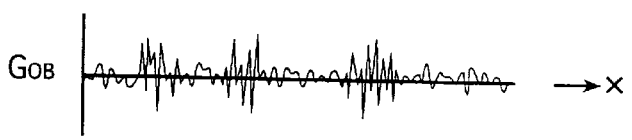
FIG.5  $C_{RGB}$  
FIG.6  $G_{Ag}$  
FIG.7A  $G_{Dye,R}$  
FIG.7B  $G_{Dye,G}$  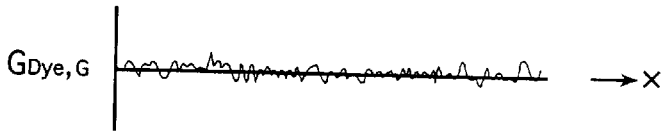
FIG.7C  $G_{Dye,G}$  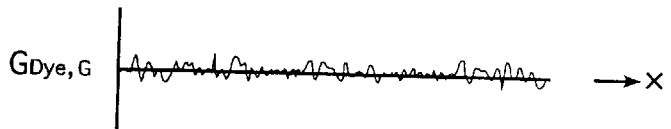

METHOD AND APPARATUS FOR PROCESSING IMAGES

BACKGROUND OF THE INVENTION

This invention relates to a method and an apparatus of image processing for graininess or noise suppression and sharpness enhancement of digital images, or specifically to a method and an apparatus by which noise such as graininess in digital images can be suppressed while enhancing their sharpness.

In digital imaging technology which records or captured images on silver halide photographs or the like with an image input scanner and which outputs digital images with an image output printer, considerable deterioration occurs in the sharpness of the output images due to the scanner and the printer. As a corrective procedure, sharpness enhancement is conventionally performed by means of a Laplacian filter or an unsharp masking (USM). However, sharpening the image causes the side effect of enhancing image noises including graininess in the image and electrical noise in the scanner or the like, thereby deteriorating the noises including graininess. The resultant image gives a visually unpleasing impression. Hence, images can be subjected to only moderate sharpness enhancement within a range where the visually unpleasing impression is not given.

Especially, where a silver halide color photographic material for use in photographing includes undeveloped silver halide grains and developed silver grains in addition to color-produced cyan, magenta and yellow dyes, for example in the case of a silver halide color photographic material as mentioned in Examples of the commonly assigned EP-A-800114, when the aforementioned sharpness enhancement in the prior art or arithmetic operations for digital image processing such as color correction and gradation correction is performed, graininess is enhanced due to the undeveloped silver halide grains and developed silver grains included in the image, which makes the image quality unpreferred.

Several methods have been proposed to process digital images such as to remove noisy graininess and enhance their sharpness. Removal of graininess involves an averaging or blurring technique. Then, the blurred grainy pattern will not be pleasing to the eye, or fine structures of the image that are not to be removed will be erased together with the graininess, or artifacts that cause unnatural and strange impressions will occur. For these and other reasons, the conventional techniques for removing graininess are not suitable for application to aesthetic images such as photographs.

For example, in the above-described prior art method of processing images to suppress their graininess while enhancing their sharpness, unsharp masking is employed to enhance the sharpness whereas blurring or smoothing is effected to suppress the graininess, such that a graininess (noise) signal and a contour signal are separated from the original image by signal level and the contour signal is subjected to sharpness enhancement whereas the smoothed region is suppressed in graininess and the smaller signal is regarded as representing graininess and processed accordingly; as a result, signals representing the fine details of the image which are close to signal levels representing graininess, namely, image signals representing the texture of cloths, lawn, the hair on the head and the like, will be suppressed along with the graininess, yielding visually unpleasing images that contain artifacts from image processing. In the conventional image processing technology where blurring or averaging is used as the method of suppressing graininess, a blurred grainy pattern seems to be reduced; however, the blurred grainy pattern spreads and will be recognized as a visually unpleasing pattern, which stands out markedly in someone's face or skin as in portraits or in solid subjects such as walls or sky.

SUMMARY OF THE INVENTION

The present invention has been accomplished under these circumstances. Images such as those in photographs, in printed documents, on television's screens, in digital still photographs and from various kinds of copiers, especially photographic images including the above-described undeveloped silver halide grains and developed silver grains suffer from the camera-induced blur, the deterioration in noise and sharpness which is inherent in the image as exemplified by graininess and blur in photographic materials or the above-mentioned defects encountered when digitizing the original image with an image input device such as a scanner, that is, graininess is enhanced to produce a visually unpleasing impression; low-contrast image signals are mistaken for graininess and suppressed or entirely eliminated; and the boundary between a region from which graininess has been removed and a region where sharpness enhancement has been done becomes discontinuous to produce unnatural artifacts in the output image. The purpose of the present invention is to provide a method and an apparatus for processing digital images to suppress noise and enhance sharpness, by which graininess can be suppressed and image sharpness enhanced without causing any of the defects associated with the prior art.

In order to achieve the above purpose, according to the present invention, there is provided a method of processing a digital image for noise suppression and sharpness enhancement, comprising the steps of:

performing first a sharpness enhancing process on original image data of an original image to create sharpness enhanced image data in which an image and a noise included therein are both sharpened;

performing a smoothing process on the original image data to create smoothed image data;

subtracting the smoothed image data from the sharpness enhanced image data to create image data containing subject image edges and the noise of which the sharpness enhancement is achieved;

performing an edge detection from the original image data to determine weighting data for an edge region and weighting data for a noise region used to discriminate the edge region of a subject and the noise region;

multiplying the image data containing the subject image edges and the noise by the weighting data for the noise region to determine noise data of each color in the noise region;

subsequently determining a black-and-white noise component and a color noise component from the noise data of the each color;

multiplying the thus obtained black-and-white noise component and color noise component by their suppressing coefficients to determine a black-and-white noise suppressing component and a color noise suppressing component; and selectively removing the black-and-white noise suppressing component and the color noise suppressing component from the sharpness enhanced image data, thereby creating a processed image in which the noise suppression is achieved while retaining the sharpness enhancement in the edge region of the image.

In the image processing method according to a first embodiment of the invention, it is preferred that the black-and-white noise component and the color noise component are respectively determined as a component which exists equally in the each color and as a component which exists independently in the each color, based on a color correlation component obtained by calculating a color correlation of the noise data of the each color in the noise region.

The weighting data for the noise region is preferably determined from the weighting data for the edge region.

The present invention also provides an apparatus for processing a digital image for noise suppression and sharpness enhancement, comprising:

- a sharpness enhancing unit which performs a sharpness enhancing process on original image data of an original image to create sharpness enhanced image data in which an image and a noise included therein are both sharpened;
- a smoothing unit which performs a smoothing process on the original image data to create smoothed image data;
- an edge/noise component extracting unit which subtracts the smoothed image data from the sharpness enhanced image data to create image data containing subject image edges and the noise of which the sharpness enhancement is achieved;
- an edge detecting unit which performs an edge detection from the original image data to determine weighting data for an edge region used to discriminate the edge region of a subject and a noise region;
- a weighting coefficient calculating unit for the noise region in which weighting data for the noise region is determined from the weighting data for the edge region;
- a noise component discriminating unit in which the image data containing the subject image edges and the noise is multiplied by the weighting data for the noise region to determine noise data of each color in the noise region, from which a black-and-white noise component and a color noise component are determined, after which the thus obtained black-and-white noise component and color noise component are multiplied by their suppressing coefficients to determine a black-and-white noise suppressing component and a color noise suppressing component; and
- an output image calculating unit which selectively removes the black-and-white noise suppressing component and the color noise suppressing component from the sharpness enhanced image data, thereby creating a processed image in which the noise suppression is achieved while retaining the sharpness enhancement in the edge region of the image.

In the image processing apparatus according to the first embodiment of the invention, the noise component discriminating unit determines preferably the black-and-white noise component which exists equally in the each color and the color noise component based on a color correlation component obtained by calculating a color correlation of the noise data of the each color in the noise region.

In the image processing method and apparatus according to the first embodiment of the invention, preferably, the noise includes graininess; the noise region, the black-and-white noise component and the color noise component are a grainy region, a black-and-white grain component and a dye grain component, respectively; the original image is an image recorded on a silver halide color photographic material; and the black-and-white grain component includes at least one of undeveloped silver halide grains and developed silver grains.

It is also preferred that the original image data is image data captured with an image pickup device such as a scanner, an imaging device or imaging elements from an image recorded on a silver halide color photographic material, and that the black-and-white noise component includes not only a black-and-white grain component formed of at least one of undeveloped silver halide grains and developed silver grains, but also a fixed pattern noise of the image pickup device (the scanner, the imaging device or the imaging elements).

It is further preferred that the original image is an image recorded with an image pickup device such as a scanner, an imaging device or imaging elements, and that the black-and-white noise component is a fixed pattern noise of the image pickup device (the scanner, the imaging device or the imaging elements), which is strong in the color correlation, whereas the color noise component is a noise which is weak in the color correlation.

In the image processing method according to a second embodiment of the invention, it is preferred that the noise includes graininess, and the noise region, the noise data, the black-and-white noise component, the color noise component, the black-and-white noise suppressing component and the color noise suppressing component are a grainy region, grain data, a black-and-white grain component, a dye grain component, a black-and-white grain suppressing component and a dye grain suppressing component, respectively, and that a local grain coefficient representing a spatial magnitude and a variation magnitude of density variations due to the graininess is determined and used to discriminate and separate the black-and-white grain component and the dye grain component from the grain data of the each color in the grainy region.

That is, the second embodiment of the invention provides a method of processing a digital image for noise suppression and sharpness enhancement, comprising the steps of:

- performing first a sharpness enhancing process on original image data of an original image to create sharpness enhanced image data in which the image and a noise or graininess included therein are both sharpened;
- performing a smoothing process on the original image data to create smoothed image data;
- subtracting the smoothed image data from the sharpness enhanced image data to create image data containing subject image edges and the grain of which the sharpness enhancement is achieved;
- performing an edge detection from the original image data to determine weighting data for an edge region and weighting data for a grainy region used to discriminate the edge region of a subject and the grainy region;
- multiplying the image data containing the subject image edges and the grain by the weighting data for the grainy region to determine grain data of each color in the grainy region;
- subsequently determining a local grain coefficient representing a spatial magnitude and a variation magnitude of density variations due to the graininess to discriminate and separate the black-and-white grain component and the dye grain component from the grain data of the each color;
- multiplying the thus obtained black-and-white grain component and dye grain component by their suppressing coefficients to determine a black-and-white grain suppressing component and a dye grain suppressing component; and selectively removing the black-and-white grain suppressing component and the dye grain suppressing component from the sharpness enhanced image data, thereby creating a processed image in which the graininess suppression is achieved while retaining the sharpness enhancement in the edge region of the image.

In the image processing apparatus according to the second embodiment of the invention, it is preferred that the noise includes graininess, and the noise region, the noise data, the black-and-white noise component, the color noise component, the black-and-white noise suppressing component, the color noise suppressing component, the edge/noise component extracting unit, the weighting coefficient calculating unit for the noise region and the noise component discriminating unit are a grainy region, grain data, a black-and-white grain component, a dye grain component, a black-and-white grain suppressing component, a dye grain suppressing component, an edge/grain component extracting subsection, a weighting coefficient calculating subsection for the grainy region and a processing subsection for discriminating a grain component, respectively; and that the processing subsection for discriminating the grain component determines a local grain coefficient representing a spatial magnitude and a variation magnitude of density variations due to the graininess to discriminate and separate the black-and-white grain component and the dye grain component from the grain data of the each color in the grainy region.

That is, the second embodiment of the invention provides an apparatus for processing a digital image for noise suppression and sharpness enhancement, comprising:

a sharpness enhancing unit which performs a sharpness enhancing process on original image data of an original image to create sharpness enhanced image data in which an image and a noise or graininess included therein are both sharpened;

a smoothing unit which performs a smoothing process on the original image data to create smoothed image data;

an edge/grain component extracting unit which subtracts the smoothed image data from the sharpness enhanced image data to create image data containing subject image edges and the grain of which the sharpness enhancement is achieved;

an edge detecting unit which performs an edge detection from the original image data to determine weighting data for an edge region used to discriminate the edge region of a subject and a grainy region;

a weighting coefficient calculating unit for the grainy region in which weighting data for the grainy region is determined from the weighting data for the edge region;

a grain component discriminating unit in which the image data containing the subject image edges and the grain is multiplied by the weighting data for the grainy region to determine grain data of each color in the grainy region, from which a local grain coefficient representing a spatial magnitude and a variation magnitude of density variations due to the graininess is determined to discriminate and separate the black-and-white grain component and the dye grain component, after which the thus obtained black-and-white grain component and dye grain component are multiplied by their suppressing coefficients to determine a black-and-white grain suppressing component and a dye grain suppressing component; and an output image calculating unit for selectively removing the black-and-white grain suppressing component and the dye grain suppressing component from the sharpness enhanced image data, thereby creating a processed image in which the graininess suppression is achieved while retaining the sharpness enhancement in the edge region of the image.

In the image processing method and apparatus according to the second embodiment of the invention, it is preferred that the original image is an image recorded on a silver halide color photographic material and that the black-and-white grain component includes at least one of undeveloped silver halide grains and developed silver grains.

It is also preferred that the original image data is image data captured with an image pickup device such as a scanner, an imaging device or imaging elements from an image recorded on a silver halide color photographic material, and that the black-and-white grain component includes not only a grain component formed of at least one of undeveloped silver halide grains and developed silver grains, but also at least one of a random noise of the each color, a fixed pattern noise of the image pickup device (the scanner, the imaging device or the imaging elements) and moire due to aliasing.

Further, in the image processing methods and apparatuses in the first and second embodiments of the invention, it is preferred that the edge detection is performed by a local variance, and that the sharpness enhancing process and the smoothing process are Gaussian unsharp masking and Gaussian masking, respectively. However, these are not of course the sole cases of the invention, and other techniques may be used.

The sharpness enhancement is preferably applied in a necessary and sufficiently intense manner, although graininess is considerably marked without being suppressed.

In the present invention, the sharpness enhancing process is first performed on a color original image to sharpen the image and graininess or noise included therein, after which the edge region and the flat region of the image are divided. The flat region is then regarded as the noise region or grainy region to detect noise or grain signals.

Then, in the first embodiment of the invention, for example, color correlation of the noise or grain signals of red (R), green (G) and blue (B) is calculated, and the thus obtained color correlation component is regarded as the black-and-white noise (or black-and-white grain) which is equally included in the three colors, if the color correlation is strong, and as the color noise (or dye grain) which is independently included therein, if the color correlation is weak. Thus, the two noises (or grains) are discriminated. The thus discriminated black-and-white noise (or black-and-white grain) can be selectively removed from the noise (or grainy) region of the sharpness enhanced image signals of the three colors, thereby removing for example the black-and-white grain component formed of undeveloped silver halide grains and developed silver grains in a silver halide color photographic material, and other black-and-white noise component such as a fixed pattern noise in a scanner or imaging device. On the other hand, the remaining color noise (or dye grain) is subjected to the noise (or graininess) suppression for each color.

In the second embodiment of the invention, for example, characteristic quantities of the signals produced by a morphological difference between the black-and-white grain and the dye grain are calculated from the grain signals of R, G and B. Thus, the two grains are discriminated. The thus discriminated black-and-white grain can be selectively removed from the grainy region of the sharpness enhanced image signals of the three colors, thereby removing the black-and-white grain component formed of undeveloped silver halide grains and developed silver grains in a silver halide color photographic material. On the other hand, the dye grain is subjected to the graininess suppression for each color of R, G and B.

According to the method for noise (or graininess) suppression as applied to the image processing method and apparatus of the invention, the noise (or grain) component is also finely subdivided by sharpness enhancement together with the subject component of the image. The noise (or graininess) is suppressed by a method of subtracting the noise (or grain) component from the sharpness enhanced image. Therefore, the noise (or graininess) achieved by this technique is spatially finer and lower in density contrast than it initially was. Since the noise (or graininess) is refined spatially, it can be as fine as is achieved when fine-grain emulsions are used to process silver halide color photographic materials.

BRIEF DESCRIPTION OF THE DRAWINGS

FIG. 1 is a block diagram showing an exemplary system in which an image processing apparatus according to the invention is incorporated, and in which a read color photographic image is outputted with an output apparatus after being subjected to image processing for graininess suppression and sharpness enhancement;

FIG. 2 is a block diagram showing an embodiment of the apparatus of the invention for processing images to suppress their graininess and enhance their sharpness;

FIG. 4A is a graph schematically showing an exemplary two-dimensional density profile $G_{0R}(x,y)$ expressed in the direction x of the grain component R in an image of a silver halide film; said density profile being obtained in the step of discriminating and separating the grain and edges in the image processing method shown in FIG. 3;

FIG. 4B is a graph schematically showing an exemplary two-dimensional density profile $G_{0G}(x,y)$ expressed in the direction x of the grain component G in an image of a silver halide film; said density profile being obtained in the step of discriminating and separating the grain and edges in the image processing method shown in FIG. 3;

FIG. 4C is a graph schematically showing an exemplary two-dimensional density profile $G_{0B}(x,y)$ expressed in the direction x of the grain component B in an image of a silver halide film; said density profile being obtained in the step of discriminating and separating the grain and edges in the image processing method shown in FIG. 3;

FIG. 5 is a graph schematically showing an exemplary two-dimensional density profile $C_{RGB}(x,y)$ expressed in the direction x of the color correlation component of RGB in an image of a silver halide film; said density profile being obtained in the step of discriminating and separating the black-and-white grain and the dye grain in the image processing method shown in FIG. 3;

FIG. 6 is a graph schematically showing an exemplary two-dimensional density profile $G_{Ag}(x,y)$ expressed in the direction x of the black-and-white grain component in an image of a silver halide film; said density profile being obtained in the step of discriminating and separating the black-and-white grain and the dye grain in the image processing method shown in FIG. 3;

FIG. 7A is a graph schematically showing an exemplary two-dimensional density profile $G_{DyeR}(x,y)$ expressed in the direction x of the dye grain component in an image of a silver halide film; said density profile being obtained in the step of discriminating and separating the black-and-white grain and the dye grain in the image processing method shown in FIG. 3;

FIG. 7B is a graph schematically showing an exemplary two-dimensional density profile $G_{DyeG}(x,y)$ expressed in the direction x of the dye grain component in an image of a silver halide film; said density profile being obtained in the step of discriminating and separating the black-and-white grain and the dye grain in the image processing method shown in FIG. 3;

FIG. 7C is a graph schematically showing an exemplary two-dimensional density profile $G_{DyeB}(x,y)$ expressed in the direction x of the dye grain component in an image of a silver halide film; said density profile being obtained in the step of discriminating and separating the black-and-white grain and the dye grain in the image processing method shown in FIG. 3;

DETAILED DESCRIPTION OF THE INVENTION

The method and apparatus of the invention for processing digital images to suppress their noise and enhance their sharpness are now described below in detail with reference to the preferred embodiments shown in the accompanying drawings.

Figure 3:
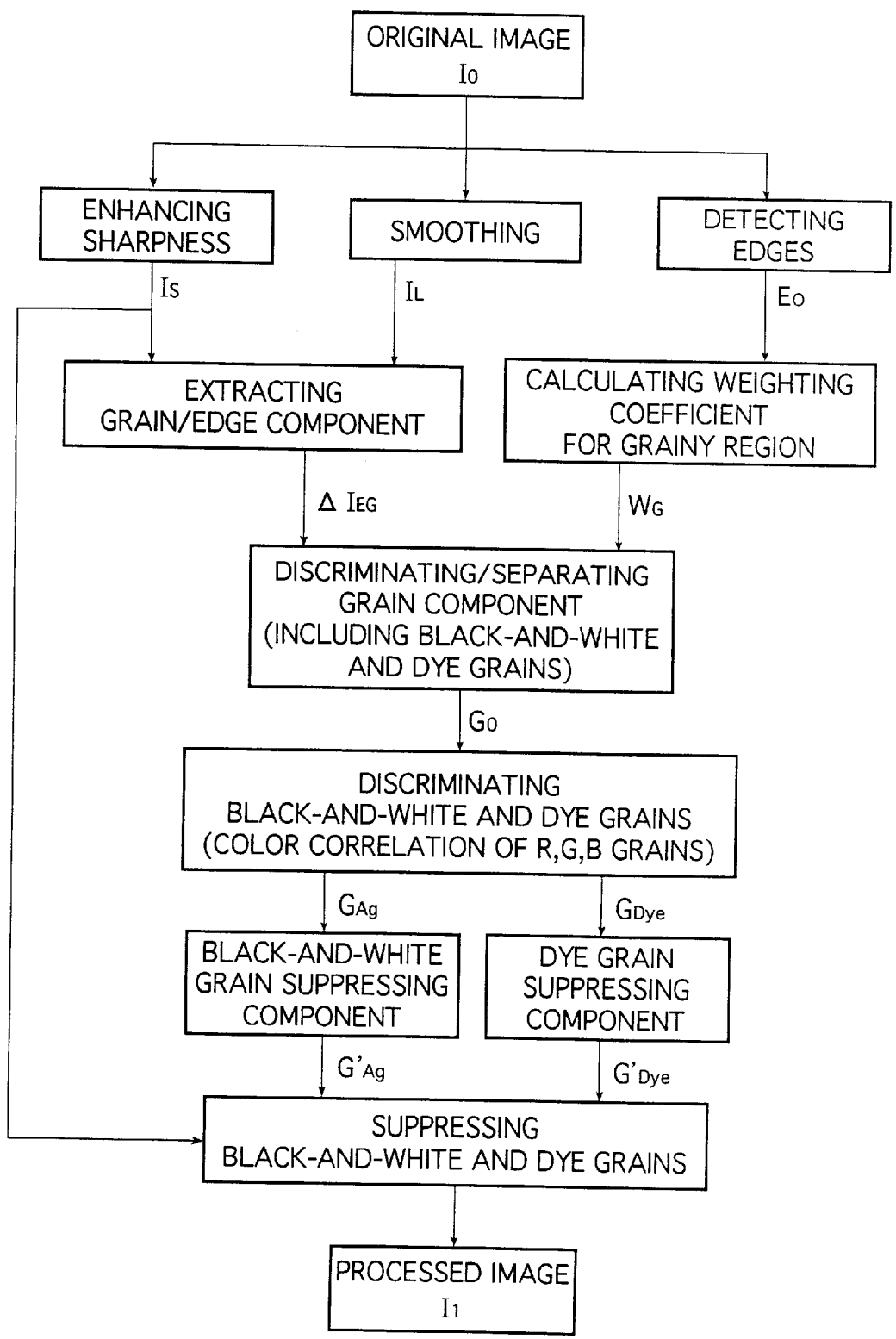
FIG. 3 is a flowchart showing an embodiment of the image processing method of the invention to enhance sharpness while suppressing graininess.

FIG. 1 is a block diagram showing a color image reproducing system in which an image processing apparatus according to the invention is incorporated and in which a read color image is outputted after being subjected to image processing for graininess suppression and sharpness enhancement. FIG. 2 is a block diagram showing an embodiment of the image processing apparatus for implementing the image processing method of the invention. FIG. 3 is a flowchart showing an example of the processing algorithm in the image processing method of the invention. In the following description, the digital image and the color image data are typified by a color photographic image and three color data of red (R), green (G) and blue (B), respectively. The present invention is not however limited to the above.

As shown in FIG. 1, a color image reproducing system comprises an image input apparatus 12 in which a color image such as a color photographic image (an image on a film such as a color negative or reversal film, or an image taken with a digital camera or the like) is read to obtain digital input image data; an image processing apparatus 14 in which the image data inputted from the image input apparatus 12 is subjected to not only specified image processing steps, but also the image processing of the invention for noise suppression and sharpness enhancement of the digital image to thereby obtain output image data $I_1$; and an image output apparatus 16 for outputting a color image such as a print image based on the output image data $I_1$ outputted from the image processing apparatus 14.

The image input apparatus 12 creates digital color image data and outputs it as input image data to the image processing apparatus 14. Examples thereof include an image pickup device, more particularly, a film scanner in which an image on a color (or monochromic) film such as a color (or monochromic) negative or reversal film is read with imaging device such as CCD elements to create digital image data; a scanner for reflection original in which an image on a color reflection original such as a printed document or a reflection print is read with imaging device to create digital image data; a driver in which a digital camera, digital still camera or video camera used in creating digital image data by direct photographing of a subject, or recording media for accommodating the created digital image data as exemplified by smart media, semiconductor memories including a PC card, magnetic recording media including an FD and a Zip, magneto-optical recording media such as an MO and an MD, optical recording media including a CD-ROM and a Photo-CD, are driven to read digital image data; display units such as a CRT monitor and a liquid-crystal monitor in which the digital image data is read to represent as a soft copy image; and computer systems including a PC and a WS for use in entire or partial image processing of the read or displayed digital image data.

The image output apparatus 16 outputs a color image having a color input image such as a color photographic image reproduced therein, based on the image data outputted from the image processing apparatus 14 as finally processed image data. Specific examples include image output apparatuses including various types of digital color printers such as a digital photoprinter for outputting a color image on a hard copy (reflection print or reflection original), a copier, an electrophotographic printer, a laser printer, an ink-jet printer, a thermally sublimating printer and a TA; display units for representing soft copy images including a TV, a CRT monitor and a liquid-crystal monitor and the like; and computer systems including a PC and a WS.

The image processing apparatus 14 characterizing the invention comprises a color/tone processing section 18, an image processing section for graininess suppression and sharpness enhancement 20 which is the most characterizing portion of the invention and an image monitor/image processing parameter setting section 22. The color/tone processing section 18 subjects the image data inputted from the image input apparatus 12 to color and tone (gradation) adjustment so that the image data outputted to the image output apparatus 14 can be reproduced with desired color and tone, thereby obtaining original image data $I_0$. The image processing section 20 subjects the original image data $I_0$ obtained in the color/tone processing section 18 to the image processing method of the invention being implemented for noise suppression and sharpness enhancement of a digital image, thereby creating output image data $I_1$. The section 22 includes an image monitor for displaying the reproduced image based on the image data with adjusted color/tone reproducibility, and an image processing parameter setting section to set parameters for various necessary image processing and the image processing of the invention.

The color/tone processing section 18 performs color conversion or color correction (including gradation conversion or correction) on the image data inputted from the image input apparatus 12 so that the color and tone (gradation) thereof can be appropriately reproduced in the image output apparatus 16, thereby creating the original image data $I_0$ for implementing the image processing method of the invention. Specific processing steps to be performed therein include a color (gray) conversion or correction, gradation correction, density (brightness) correction, saturation correction, magnification conversion, compression/expansion of density's dynamic range and so forth.

The image monitor/image processing parameter setting section 22 is composed of the image monitor and the image processing parameter setting section, and the input image is displayed on the image monitor based on the input image data from the image input apparatus 12. The image monitor is also used to set parameters (for example by means of GUI) for various image processing of the input image data to be performed in the color/tone processing section 18 and the image processing section for graininess suppression and sharpness enhancement 20 where the image processing method of the invention is implemented, by means of data input devices including a mouse and a keyboard (not shown). The parameters to be set therein include coefficients and other parameters necessary for implementing the image processing method of the invention to be described below in detail, as exemplified by correction coefficients, conversion coefficients and magnifications to be used in various processing as described above.

The image processing section for graininess suppression and sharpness enhancement (which is hereinafter simply referred to as "image processing section") 20 for implementing the image processing method of the invention subjects the original image data $I_0$ created in the color/tone processing section 18 to the image processing for graininess suppression and sharpness enhancement characterizing the invention, thereby creating the finally processed image data $I_1$ to be outputted to the image output apparatus 16.

As shown in FIG. 2, the image processing section 20 comprises a sharpness enhancing subsection 24, a smoothing subsection 26, an edge/grain component extracting subsection 28, an edge detecting subsection 30, a weighting coefficient calculating subsection for grainy region 32, a processing subsection for discriminating grain component 34 and an output image calculating subsection 36.

First, the sharpness enhancing subsection 24 in the image processing section 20 performs sharpness enhancement on the original image data $I_o$ to create sharpness enhanced image data Is in which not only the image but also the graininess or noise included therein is sharpened. The smoothing subsection 26 performs smoothing on the original image data $I_o$ to create smoothed image data $I_L$. The edge/grain component extracting subsection 28 subtracts the smoothed image data $I_L$ from the sharpness enhanced image data $I_S$ to create image data $\Delta I_{EG}$ containing subject image edges and grain which are both enhanced in sharpness. The edge detecting subsection 30 performs edge detection from the original image data $I_o$ to determine an edge component $E_o$ for discriminating the edge region of the subject and the grainy region. The weighting coefficient calculating subsection for grainy region 32 determines weighting data for the grainy region $W_G$ from the edge component $E_o$. The processing subsection for discriminating grain component 34 multiplies the image data $\Delta I_{EG}$ obtained in the edge/grain component extracting subsection 28 by the weighting data for the grainy region $W_G$ to determine grain data $G_o$ of the grainy region for each color of R, G and B. In a first embodiment, a black-and-white grain component $G_{Ag}$ which exists equally in three colors of R, G and B, and a dye grain component $G_{Dye}$ which exists independently in three colors of R, G and B are discriminated and separated based on a color correlation component $C_{RGB}$ obtained by calculating the color correlation between the grain data $G_o$ of R, G and B. In a second embodiment, the difference in signal variation (spatial magnitude and variation magnitude in density variation) due to a morphological difference between the black-and-white grain component formed of (undeveloped) silver halide grains and developed silver grains, and the dye grain component formed of dye cloud is used to discriminate and separate the black-and-white grain component $G_{Ag}$ and the dye grain component $G_{DYe}$ from the grain data $G_o$ of R, G and B. The thus separated black-and-white grain component $G_{Ag}$ and dye grain component $G_{Dye}$ are multiplied by suppressing coefficients $\alpha_{Ag}$ and $\alpha_{Dye}$ to determine a black-and-white grain suppressing component $G'_{Ag}$ and a dye grain suppressing component $G'_{Dye}$, respectively. Finally, the output image calculating subsection 36 subtracts the black-and-white grain suppressing component $G'_{Ag}$ and the dye grain suppressing component $G'_{Dye}$ from the sharpness enhanced image data $I_S$ created in the sharpness enhancing subsection 24 to selectively remove these suppressing components, whereupon the finally processed image data $I_1$ is created as output image data for outputting into the image output apparatus 16.

The image processing section 20 shown in FIG. 2 is basically constructed as described above.

We now describe the operation of the image processing section 20 and the image processing method in the first embodiment of the invention in detail with reference to FIG. 3 showing a flowchart for a processing algorithm according to the first embodiment of the image processing method of the invention.

According to the invention, as shown in FIGS. 2 and 3, a sharpness enhanced image $I_S$ and a smoothed image $I_L$ are first created from the original image $I_0$ for each color and each pixel in the sharpness enhancing subsection 24 and the smoothing subsection 26, respectively, and fine image data $\Delta I_{EG}$ in which both edges and grain (noise) exist is extracted in the edge/grain component extracting subsection 28.

On the other hand, an edge component $E_0$ of the subject in the image is detected from the original image $I_0$ in the edge detecting subsection 30, and weighting data (x,y) for the grainy region $W_G$ is determined from the edge component $E_0$ in the weighting coefficient calculating subsection for grainy region 32.

The weighting coefficient data for the grainy region $W_G(x,y)$ obtained in the weighting coefficient calculating subsection for grainy region 32 is first multiplied in the processing subsection for discriminating grain component 34 by the edge/grain containing fine image data $\Delta I_{EG}$ (x,y) previously obtained in the edge/grain component extracting subsection 28 to thereby discriminate and separate a grain component $G_o$ of the grainy region for each color of R, G and B. The grain component $G_o$ includes a black-and-white grain component formed of silver grains such as undeveloped silver halide grains and developed silver grains, and a dye grain component.

Next, a color correlation component $C_{RGB}$ is calculated from the grain components $G_o$ of R, G and B, and is regarded as representing the black-and-white grain component which is mainly formed of the above-mentioned silver grains, and which exists equally in the three primary colors of R, G and B. The color correlation component $C_{RGB}$ previously multiplied by a specified coefficient is multiplied by the grain components $G_o$ of R, G and B to determine a black-and-white grain component $G_{Ag}$ that has a (strong) color correlation. On the other hand, the black-and-white grain component $G_{Ag}$ is subtracted from the grain components $G_o$ to determine a dye grain component $G_{Dye}$ which exists independently in three colors of R, G and B. The black-and-white grain component $GA_g$ and the dye grain component $G_{Dye}$ are discriminated and separated from the grain components $G_o$.

Subsequently, the black-and-white grain component $G_{Ag}$ and the dye grain component $G_{Dye}$ are multiplied by their respective suppressing coefficients $\alpha_{Ag}$ and $\alpha_{Dye}$ to determine a black-and-white grain suppressing component $G'_{Ag}$ and a dye grain suppressing component $G'_{Dye}$.

Finally, the output image calculating subsection 36 subtracts the black-and-white grain suppressing component $G'_{Ag}$ and the dye grain suppressing component $G'_{Dye}$ from the sharpness enhanced image data $I_S$ created in the sharpness enhancing subsection 24 to selectively remove these suppressing components, whereupon finally processed image $I_1$ with graininess being suppressed and sharpness in the edge region of the image being enhanced can be created as output image data for outputting into the image output apparatus 16.

According to the most characterizing part of the invention, i) first, the sharpness enhanced image and the smoothed image are created from the original image, and the edge/grain containing image data is created;

ii) the weighting coefficient for the grainy region as calculated from the edge image data separately obtained from the original image by a local variance method or the like is used to discriminate the edge component and the grain component from the edge/grain containing image data and extract the grain component;

iii) from the edge component is determined the weighting function in the flat region $W_G$ which is used to retain sharpness enhancement in the edge region of the image while suppressing the graininess in the flat region; and iv) the graininess of the image is suppressed by a refining technique and the edges (contour) of the image and the grainy region are discriminated by nonlinear conversion, whereby the process of suppressing graininess and that of enhancing sharpness are distributed in a fuzzy manner. In other words, the boundary between the grainy region and the edge region is not as abrupt as occurs when a circuit is switched on and off. Instead, the two regions overlap and their relative proportions vary so smoothly that the boundary will not stand out markedly but will give a quite natural impression.

Then, the individual steps in the image processing method of the invention will be described below briefly with reference to FIGS. 2 and 3.

1) Sharpness enhancing step by sharpness enhancing subsection 24:

Unsharp masking (USM), Gaussian unsharp masking (Gaussian USM) or Laplacian filtering is used to perform sharpness enhancement on an original image $I_o$ so as to remedy the blur on the image and improve sharpness, thereby obtaining a sharpness enhanced image $I_S$.

2) Step of extracting edge/grain component by edge/grain component extracting subsection 28:

Averaging of the original image with an n X n smoothing mask or blurry masking is used to create a smoothed image $I_L$ from the original image $I_0$ in the smoothing step by the smoothing subsection 26; edge/grain containing fine image data $\Delta I_{EG}$ is created from the sharpness enhanced image $I_S$.

3) Step of calculating weighting coefficients for edge and flat regions by weighting coefficient calculating subsection for grainy region 32:

An edge detecting mask as in the local variance method is used in the edge detecting subsection 30 to detect an edge component $E_0$ of the subject in the image from the original image $I_o$. Using the thus detected edge component $E_0$, a weighting function for the flat (grainy) region $W_G$ in which graininess suppression is desired is determined.

4) Step of discriminating and separating edges and grain by processing subsection for discriminating grain component 34:

The edge/grain containing fine image data $\Delta I_{EG}$ previously obtained is multiplied by the weighting function for the grainy region $W_G$ to determine grain components $G_o$.

5) Step of discriminating and separating black-and-white grain component $G_{Ag}$ and dye grain component $G_{Dye}$ by processing subsection for discriminating grain component 34:

A color correlation component $C_{RGB}$ of the grain is calculated from the grain components $G_o$ of R, G and B, and is regarded as representing a black-and-white grain component $G_{Ag}$ which is mainly formed of undeveloped silver halide grains and developed silver grains. The remaining component obtained by removing the black-and-white grain component $G_{Ag}$ from the original grain components $G_o$ is regarded as a dye grain component $G_{Dye}$.

6) Step of calculating suppressing components of black-and-white grain and dye grain by processing subsection for discriminating grain component 34:

The black-and-white grain component $G_{Ag}$ and the dye grain component $G_{Dye}$ are multiplied by suppressing constants $\alpha_{Ag}$ and $\alpha_{Dye}$ to obtain a black-and-white grain suppressing component $G_{Ag}$ and a dye grain suppressing component $G_{Dye}$, respectively.

7) Step of suppressing black-and-white grain and dye grain from sharpness enhanced image or calculating finally processed image by output image calculating subsection 36:

The black-and-white grain suppressing component $G'_{Ag}$ and the dye grain suppressing component $G'_{Dye}$ obtained in the grainy region are subtracted from the sharpness enhanced image $I_S$ to obtain a finally processed image $I_1$ in which sharpness is enhanced in the edge region of the subject of the original image $I_o$ and graininess is suppressed in the grainy region.

In the present invention, sharpness enhancement in the edge region of the image and graininess suppression in the flat region of the image can be achieved by performing the above-mentioned image processing. In the present invention, parameters for determining the degree of graininess suppression can be also established automatically based on the root mean square (RMS) of the density variations ΔD in the grain and edge components.

Further, a computer or a dedicated processor 14 can be used to process the digitized image data by the image processing algorithm of the invention for suppressing graininess or noise and enhancing sharpness as described above.

The images to be processed by the image processing method and apparatus of the invention are not limited to any particular kinds and they include not only images on hard copies such as photographs using a silver halide color photographic material including a silver halide color film, photographs by a digital camera, printed documents, and outputs from various kinds of copiers but also images on soft copies such as those displayed on television's screen, computer's CRT and liquid-crystal display units.

In particular, the present invention does not require any processing for silver removal unlike the photographic materials described in Examples 1 to 5 of EP-A-800,114. Then, images carried on a photographic material in which undeveloped silver halide and developed silver remain is preferably used.

In the foregoing description, graininess has been taken as a typical example of the noise that need be suppressed in the images just mentioned above. However, this is not the sole case of the invention and it may be applicable to any types of noise that come out grainy in reproduced images, as exemplified by the noise inherent in the original image due, for example, to the grain and the like of a photographic material, the noise that is added when the original image is read with an image input apparatus such as a scanner and converted to a digital image, and the noise that comes in when image is picked up with a video camera, an electronic still camera or a digital still camera and converted to a digital image.

In the foregoing description, the black-and-white grain component formed of silver grains such as undeveloped silver halide grains and developed silver grains and the dye grain component in a silver halide color photographic material are particularly illustrated as the grain or noise to be suppressed after having been discriminated and separated. The invention is not however limited to this case, and the grain may be, for example, a fixed pattern noise of imaging device (CCD or MOS type) in a scanner, a digital camera and the like, and a noise or artifact which has a strong color correlation or a color correlation between R, G and B as in moiré due to aliasing, in addition to random noise of R, G, B due to the black-and-white grain.

The individual steps in the image processing method of the invention will now be described below in greater details.

1) To begin with, the step of sharpness enhancement is described.

Two well known methods of enhancing the sharpness of an image are by unsharp masking (USM) and Laplacian filtering. If the deterioration in the sharpness of the original image is not too great, these methods may effectively be used in the invention to enhance the sharpness of the image.

Unsharp masking is a method of determining a sharpness enhanced image $I_S(x,y)$ by the following equation (1), in which the original image $I_0(x,y)$ is averaged or blurred to yield an image $<I_0(x,y)>$ which is subtracted from $I_0(x,y)$ to give an edge enhanced component $I_0(x,y) - <I_0(x,y)>$, which is subsequently multiplied by a factor "a" and added to the original image $I_0(x,y)$:

$$I_S(x,y) = I_0(x,y) + a[I_0(x,y) - <I_0(x,y)>] \tag{1}$$

where "a" is a constant for adjusting the degree of sharpness enhancement and x,y are coordinates representing the position of a pixel of interest in the image.

Laplacian filtering is a method of enhancing the sharpness of an image $I_0(x,y)$ by subtracting a second partial derivative (Laplace operator or Laplacian) $\nabla^2 I_0(x,y)$ from the original image, as expressed by the following equation (2):

$$I_S(x,y) = I_0(x,y) - \nabla^2 I_0(x,y) \tag{2}$$

Common specific examples of sharpness enhancement by Laplacian filtering are the following 3×3 coefficient arrays:

$$\begin{array}{ccc} 0 & -1 & 0 \\ -1 & 5 & -1 \\ 0 & -1 & 0 \end{array} \quad \begin{array}{ccc} -1 & -1 & -1 \\ -1 & 9 & -1 \\ -1 & -1 & -1 \end{array} \quad \begin{array}{ccc} 1 & -2 & 1 \\ -2 & 5 & -2 \\ 1 & -2 & 1 \end{array} \tag{3}$$

With these coefficient arrays, particularly when intense sharpness enhancement is applied, an unnatural contour is most likely to occur along the edges of the image. In order to minimize this problem, unsharp masking is preferably performed in the invention using a normal distribution (Gaussian) blurring function as expressed by the following equation (4):

$$G(x,y) = (1/2\pi\sigma^2)\exp[-(x^2+y^2)/2\sigma^2] \tag{4}$$

where $\sigma^2$ is a parameter representing the spread of the normal distribution function.

By ensuring that the ratio of the value of G(x,y) at a mask end $x=x_1$ to the value of the same function at the mask center $x=0$, which is expressed by the following equation:

$$G(x_1,0)/G(0,0)=\exp[-x_1^2/2\sigma^2] \quad (5)$$

is adjusted to lie between 0.1 and 1.0, a 3×3 unsharp mask can provide the desired sharpness. If the value of the equation (5) is adjusted to be close to 1.0, one can generate a mask that is substantially identical to the center Laplacian filter in the equation (3).

The mask sharpness can also be varied by adjusting the mask size; for example, the spatial frequency range for sharpness enhancement can be substantially altered by using masks of varying size such as 5×5, 7×7 and 9×9.

The function expressing the mask may be other than the one of a normal distribution, for example, an exponential function given by the following equation (6):

$$E(x,y)=\exp[-(x^2+y^2)^{1/2}/a] \quad (6)$$

where "a" is a parameter which has the same meaning as a in the equation (4) and represents the spread of the unsharp mask.

By ensuring that the ratio of the value of E(x,y) at a mask end $x=x_1$ to the value at the mask center $x=0$, which is expressed by the following equation (7):

$$E(x_1,0)/E(0,0)=\exp[-x_1/a] \quad (7)$$

is adjusted to lie between 0.1 and 1.0, a 3×3 unsharp mask can provide the desired sharpness. When $E(x_1,0)/E(0,0)=$ 0.3, the mask of an exponential function according to the equation (6) may numerically assume the following values:

$$\begin{array}{ccc} 0.18 & 0.30 & 0.18 \\ 0.30 & 1.00 & 0.30 \\ 0.18 & 0.30 & 0.18 \end{array} \quad (8)$$

From this mask, an unsharp mask having the following values of the respective elements may be calculated:

$$\begin{array}{ccc} -0.12 & -0.22 & -0.12 \\ -0.21 & 2.32 & -0.21 \\ -0.12 & -0.21 & -0.12 \end{array} \quad (9)$$

Using this unsharp mask, one can determine a sharpness enhanced image $I_S(x,y)$ from the original image $I_0(x,y)$. It should be noted that the unsharp mask and the method of sharpness enhancement that can be employed in the invention are by no means limited to the examples described above and any other known unsharp masks and methods of sharpness enhancement by means of spatial frequency filter and the like may of course be applicable.

2) We next describe the smoothing step.

Smoothing techniques can be classified as two processes, one being directed to a real space domain and the other to a spatial frequency domain. Processes directed to a real space domain include i) summing up the values of successive adjacent pixels, calculating the average of those values and substituting the average; ii) multiplying the values of respective pixels by weighting coefficients, for example, normal distribution functions and determining the weighted average; and iii) nonlinear processing as with a median filter. Processes directed to a spatial frequency domain include the multiplication by a low-pass filter. The averaging process using weighting coefficients may be expressed by the following equation (10):

$$I_L(x,y) = \frac{1}{n}\sum_{i=1}^{n} I_{0i}(x,y) \quad (10)$$

where n is an averaging mask size.

The following description of the invention assumes the use of a process directed to a real space domain, particularly, the averaging of values weighted by weighting coefficients of a normal distribution type. It should, of course, be noted that this is not the sole case of the invention. The processing mask to be used in the illustrated case is preferably an array of n×n pixels as set forth below. Specifically, masks of sizes on the order of 3×3, 5×5, 7×7 and 9×9 pixels are preferably employed:

$$\begin{array}{cccccc} w_{11} & w_{12} & w_{13} & \cdots & \cdots & w_{1n} \\ w_{21} & w_{22} & w_{23} & \cdots & \cdots & w_{2n} \\ w_{31} & w_{32} & w_{33} & \cdots & \cdots & w_{3n} \\ \vdots & \vdots & \vdots & & & \vdots \\ w_{n1} & w_{n2} & w_{n3} & \cdots & \cdots & w_{nn} \end{array} \quad (11)$$

An exemplary mask of 9×9 pixels is shown below by the formula (12) which is normalized to 1.0 at the central value. In actual processing, the values of the respective pixels are so selected that their total sum is 1.0.

$$\begin{array}{ccccccccc} 0.09 & 0.15 & 0.22 & 0.28 & 0.30 & 0.28 & 0.22 & 0.15 & 0.09 \\ 0.15 & 0.26 & 0.38 & 0.47 & 0.51 & 0.47 & 0.38 & 0.26 & 0.15 \\ 0.22 & 0.38 & 0.55 & 0.69 & 0.74 & 0.69 & 0.55 & 0.38 & 0.22 \\ 0.28 & 0.47 & 0.69 & 0.86 & 0.93 & 0.86 & 0.69 & 0.47 & 0.28 \\ 0.30 & 0.51 & 0.74 & 0.93 & 1.00 & 0.93 & 0.74 & 0.51 & 0.30 \\ 0.28 & 0.47 & 0.69 & 0.86 & 0.93 & 0.86 & 0.69 & 0.47 & 0.28 \\ 0.22 & 0.38 & 0.55 & 0.69 & 0.74 & 0.69 & 0.55 & 0.38 & 0.22 \\ 0.15 & 0.26 & 0.38 & 0.47 & 0.51 & 0.47 & 0.38 & 0.26 & 0.15 \\ 0.09 & 0.15 & 0.22 & 0.28 & 0.38 & 0.28 & 0.22 & 0.15 & 0.09 \end{array} \quad (12)$$

Using a mask of this kind, one can determine a smoothed image $I_L(x,y)$ from the original image $I_0(x,y)$. Needless to say, the methods described above are not the only way to perform smoothing in the present invention and any other known smoothing methods are equally applicable.

3) We next describe the step of extracting a component containing both the grain and edges.

The difference between the sharpness enhanced image $I_S(x,y)$ obtained in step 1) and the smoothed image $I_L(x,y)$ obtained in step 2) is determined by the following equation (13) and extracted as a grain/edge component $\Delta I_{EG}(x,y)$ according to the following equation:

$$\Delta I_{EG}(x,y)=I_S(x,y)-I_L(x,y) \quad (13)$$

4) We next describe the step of detecting edges. In the following description, detection of edges by a local variance method is assumed as a typical example but this is not the sole case of the invention.

(1) Preliminary processing: density conversion

The first step of edge detection is to convert density values $D_R$, $D_G$ and $D_B$ of R, G and B in the original image $I_0(x,y)$ into a visual density $D_V$ thereby reducing graininess and noise having no correlation between R, G and B and improving the precision of edge detection. The conversion formula is used to multiply the density values $D_R$, $D_G$ and $D_B$ of R, G and B, respectively, in the original image $I_0(x,y)$ by weighting factors r, g and b to convert them into the visual density $D_V$, as shown in the equation (14):

$$D_V=(rD_R+gD_G+bD_B)/(r+g+b) \qquad (14)$$

The weighting factors r, g and b may take on values such as 4, 5 and 1. The purpose of conversion to the visual density $D_V$ is to reduce graininess and noise having no correlation between R, G and B so as to improve the precision of edge detection. The array to be used in the preliminary processing is preferably of a size of about 5×5 or 7×7 pixels and this is to ensure that in the next step (2), the variations in the densities of pixels within the array can be calculated with a smaller array, say, of about 3×3 pixels being successively moved.

The weighting factors r, g and b for edge detection may be determined by the following way. In principle, they are preferably set to optimal values based on the idea that image data for a color of greater contribution that stands out when observed visually (one might as well consider that the relative conspicuity of the color corresponds to the associated spectral luminous efficiency) have greater weighting factors. Generally, empirical weighting factors have been determined on the basis of experiments for visual evaluation and the following values are available as a general finding (which is documented in Takafumi Noguchi, "Relating Granularity to Graininess", Journal of The Society of Photographic Science and Technology of Japan, 57 (6), 415 (1994); depending on colors, the reference sets forth numerical figures close to the ratios listed below):

r : g : b = 3 : 6 : 1 r : g : b = 4 : 5 : 1 r : g : b = 2 : 7 : 1

A preferred range of the values to be taken by the ratio r:g:b may be specified as follows: assuming r+g+b=10.0 and b=1.0, g is preferably in the range of 5.0–7.0, provided that r=10.0−b−g.

(2) Edge detection by a local variation method

An array of $N_E \times N_E$ pixels selected from the image data of visual density $D_V$ is moved as the variations in the densities of pixels within the preprocessing array are successively calculated by the following equation (15), with the local standard deviations σ for successive positions of move being taken as local variances, whereby the edges of the subject of interest in the image are detected. The size of the moving pixel array, $N_E \times N_E$, may be determined as appropriate for the precision of detection and the load on calculations; a preferred array size is on the order of 3×3 or 5×5 pixels:

$$\sigma_{ij} = \left\{ \frac{1}{N_E^2} \sum_i \sum_j (D_{ij} - <D>)^2 \right\}^{1/2} \qquad (15)$$

where $D_{ij}$ is the density of the array of $N_E \times N_E$ pixels which is used in calculating local variances, and $<D>$ is the average density of the array and expressed by the following equation (16):

$$<D> = \frac{1}{N_E^2} \sum_i \sum_j D_{ij} \qquad (16)$$

5) We next describe the step of calculating weighting coefficients for the edge and grainy regions by edge detection.

Nonlinear conversion (look-up table (LUT) conversion) as expressed by the following equations (17) and (18):

$$W_E(x,y)=L\{\sigma(x,y)\} \qquad (17)$$

$$W_G(x,y)=1-W_E(x,y) \qquad (18)$$

where $\sigma(x,y)=\sigma_{ij}$ is performed to determine the weighting coefficient (data) for the edge region $W_E(x,y)$ and the weighting coefficient (data) for the grainy region $W_G(x,y)$ from the local variance $\sigma(x,y)$ expressed by the equations (15) and (16). The LUT conversion $L\{\sigma(x,y)\}$ expressed by the equation (17) can be then expressed by the following equation (19):

$$L\{\sigma(x,y)\}=1-\exp[-\sigma(x,y)/a_E] \qquad (19)$$

where $a_E$ is a factor for converting the value of local variance $\sigma(x,y)$ into the weighting coefficient $W_E(x,y)$ and if the threshold of $\sigma(x,y)$ assigned to $W_E=0.5$ is written as $\sigma_T$, $a_E$ is given by $a_E=-\sigma_T/\log_e(0.5)$. The value of $\sigma_T$ must be adjusted to an appropriate value depending upon the intensity of granularity and the magnitude of the signal for the contour of the subject. With a color image of 8 bits (256 gradations) for each color, $\sigma_T$ preferably takes values within a range of 10–100. The time of calculations required to effect nonlinear conversion from $\sigma(x,y)$ to $W_E(x,y)$ can be shortened by using look-up tables (LUT).

The nonlinear converting formula $L\{\sigma(x,y)\}$ for determining the weighting coefficient for the edge region, $W_E(x,y)$, is by no means limited to the equation (19) and other formulae may be substituted, as exemplified by the following Gaussian function:

$$L\{\sigma(x,y)\}=1-\exp\{-[\sigma(x,y)]^2/a_{E1}^2\} \qquad (20)$$

where $a_{E1}$ is a coefficient for converting $\sigma(x,y)$ into $W_E(x,y)$ and if the threshold of $\sigma(x,y)$ assigned to $W_E=0.5$ is written as $\sigma_T$, $a_{E1}^2$ is given by $a_{E1}^2=-\sigma_T^2/\log_e(0.5)$. With a color image of 8 bits (256 gradations) for each color, CT preferably takes values within a range of 10–100.

In the above-mentioned edge detecting method by local variance, the local variance $\sigma(x,y)$ is calculated and subjected to nonlinear conversion, thereby directly determining the weighting coefficient for the edge region $W_E$. The invention is not however limited to this method, and the weighting coefficient for the edge region $W_E$ may be determined from the local variance $\sigma(x,y)$ obtained.

It should be noted here that the above-described local variance method is not the only way to be used for edge detection in the present invention and other edge detecting techniques may be employed, such as ones based on first and second differentials and which are each divided into subgroups as follows.

The method based on spatial first differentials may employ the following operators, a differential edge extracting operator and a template operator. Examples of the differential edge extracting operator include Prewitt's operator, Sobel's operator, and Roberts' operator which may be expressed by the following equation (21):

$$g(i,j)=\{[f(i,j)-f(i+1,j+1)]^2+[f(i+1,j)-f(i,j+1)]^2\}^{1/2} \quad (21)$$

Examples of the template operator include Robinson's operator using a 3×3 template equivalent to edge patterns for 8 directions, as well as Kirsh'es operator.

The method based on spatial second derivatives may employ a Laplacian. This method accentuates noise, so it is often implemented by first applying a blurring process of a normal distribution type before edge detection is performed.

We next describe the process of weighting the grain and edges in the step of discriminating and separating the grain and edges.

To discriminate and separate the grain and edge components, the characteristics of the grain and edges are utilized. In a spatial domain, the grain occurs in the entire part of the film or the image and it is more conspicuous in the flat area of the subject than along its contour and edges. On the other hand, the edges of the image mainly occur along the contour of the subject and in a fine structure on its surface. In a density domain, the grain is mainly composed of the grain of the photographic material used in taking the original image, so it has in most cases a small density difference. On the other hand, the edges of the image depend on the contrast of the subject and, their density difference varies greatly with the image and range from a very small difference to a significantly great one.

6) We next describe the step of discriminating and separating the grain and edges.

For discriminating and separating the grain and edges, they are first subjected to regional splitting by making use of their spatial characteristics. By multiplying the grain/edge image data (density variation value) $\Delta I_{EG}(x,y)$ by the weighting coefficient for the grainy region, $W_G(x,y)$, that has been determined using the edges of the subject as detected from the original image, the edge information in the edge region can be reduced to yield a grain component $G_0(x,y)$ having an increased proportion of the grain information in the grainy region:

$$G_0(x,y)=W_G(x,y)\times\Delta I_{EG}(x,y) \quad (22)$$

FIGS. 4A, 4B and 4C show schematically an example each of the two-dimensional density profiles $G_{0R}(x,y)$, $G_{0G}(x,y)$, $G_{0B}(x,y)$ expressed in the direction x of the grain components of R, G, B in an image (more precisely a sharpness enhanced image) on a silver halide film, respectively; said grain components being obtained in this step by discriminating and separating from the grain/edge containing image data $\Delta I_{EG}(x,y)$. It should be noted that the grain components include the black-and-white grain component formed of undeveloped silver halide grains and developed silver grains and the dye (color) grain component formed of color cloud.

As is clear from FIGS. 4A, 4B and 4C, the density profiles $G_{0R}(x,y)$, $G_{0G}(x,y)$, $G_{0B}(x,y)$ of the grain components of R, G, B have similar noises due to the silver grains in three portions.

It should be noted that, in the present invention, image information about the grain and image information about the edges may be separated by making use of the characteristics in the density domain. Namely, a signal with a small density difference $\Delta D(x,y)$ is mainly composed of a grain component and a small portion of an edge signal whereas a signal of a great density difference is mainly composed of an edge component and a small portion of a grain component with a comparatively large density difference; hence, the relative magnitude of density difference can be used to effect grain and edge separation. Separation of the grain component $G_O(x,y)$ is performed using a LUT for nonlinear conversion as expressed by the following equation (23):

$$G_o(x,y)=LUT(\Delta D(x,y)) \quad (23)$$

where LUT is given by:

$$LUT(\Delta D)=\Delta D\times\exp[-(\Delta D)^2/a_G^2] \quad (24)$$

where $a_G^2$ is a constant determined from a threshold $G_T$ for differentiating the density variation of the grain and expressed by:

$$a_G^2=-G_T^2/\log_e(1/2)$$

The threshold $G_T$ is such that grain/edge density variations $\Delta I_{EG}(x,y)$ below this value are regarded to be grainy. As will be readily understood from the equation (24), the grain and edge separation is not as sharp as is effected by turning a switch on and off at that threshold but the grain to be separated decreases in accordance with a LUT profile that gradually decreases in value with the increasing density variation. Therefore, the edges also occur together with the grain but in a gradually decreasing proportion.

If the nonlinear conversion LUT is written as a nonlinear converson function NLG, then the grain component $G_0(x,y)$ can be expressed as follows by reference to the equations (23) and (24):

$$G_o(x,y)=NLG\{\Delta I_{EG}(x,y)\times W_G(x,y)\} \quad (25)$$

The threshold $G_T$ for discriminating the grain is preferably selected for an optimal value in accordance with the magnitude of the grain and noise in the image to be processed and with the degree of the sharpness enhancement to be performed. Since the discrimination of graininess is effected on the image after sharpness enhancement, the grain of interest differs from that of the initial image in that it has become sharper as the result of sharpness enhancement and that it has an increased density variation. Therefore, in the process of suppressing graininess, the density variations of surrounding n×n pixels is referenced to express the magnitude of grain after sharpness enhancement in terms of a physical value such as RMS granularity a and the threshold for grain discrimination $G_T$ will be determined on the basis of that physical value. A specific procedure of determining $G_T$ is described below.

The graininess of color photographic materials is commonly measured with a micro-densitometer having a measuring aperture of 48 $\mu\phi$ and expressed in terms of RMS granularity. With ordinary or typical color negative films such as Super G ACE 100, 200, 400 and 800 (all manufactured by Fuji Photo Film Co., Ltd.), the graininess is in the range of 4–5 (RMS granularity σ48 times 1000). If digitization is performed by scanning the film with the aperture area A, the granularity of the film for that aperture area, $\sigma_{SC}$, can be calculated from the RMS granularity $\sigma_{48}$ by the following equation (26) using $S=\sigma\sqrt{A}$ which is the well known formula of Selwyn granularity:

$$\sigma_{SC}=\sigma_{48}\sqrt{A_{48}}/\sqrt{A_{SC}} \quad (26)$$

where $A_{48}$ is the area of the 48 $\mu\phi$ aperture. If the film's granularity is 4 and the digitized scanning aperture is 12 $\mu\phi$ (aperture area is $A_{12}$), $\sigma_{SC}$ is calculated as follows:

$$\sigma_{SC} = \sigma_{48}\sqrt{A_{48}}/\sqrt{A_{12}} = 0.016 \quad (27)$$

provided that the blur is of the magnitude whether it is due to the optics or the scanning aperture.

If the granularity $\sigma_{SC}$ increases by a factor of p upon sharpness enhancement, the following equation will hold:

$$\sigma_{SC}' = p\sigma_{SC} \quad (28)$$

The graininess discriminating threshold $G_T$ preferably takes a value proportional to the granularity of the image to be processed, as expressed by $G_T = k_G \sigma_{SC}'$, where $k_G$ is a constant preferably between 1.0 and 3.0. As the value of $G_T$ becomes greater than $\sigma_{SC'}$, the more complete is the discrimination of granularity but, on the other hand, the greater is the probability that information about a low-contrast subject which is close to grainy density variations is erroneously interpreted as representing graininess. Conversely, if the value of $G_T$ becomes smaller than $\sigma_{SC'}$, the misinterpretation of information about the subject is less likely to occur but, on the other hand, graininess of great density variations is no longer effectively eliminated and coarse graininess will remain in the processed image.

7) We next describe the step of discriminating and separating the black-and-white (silver) grain component and the dye grain component.

The black-and-white grain component formed of silver halide grains and developed silver grains is equally included in the grain components of the respective colors of R, G and B when a film is scanned with a scanner, because the spectral density distribution of the silver image is approximately flat. On the other hand, the dye cloud which forms the dye grain is generated almost independently in the respective emulsion layers of R, G and B of the silver halide film. Hence, the grainy pattern is also regarded to be almost independent from each other. Therefore, when the image data is seen from the local view, the silver grain has a larger or stronger correlation between R, G and B (or has a color correlation), whereas the dye grain has a smaller or weaker correlation, (or has no color correlation). This correlation is used to discriminate the two components.

The color correlation component $C_{RGB}(x,y)$ is calculated from the grain components $G_{oi}(x,y)$ of R, G and B where i=R, G, B, as obtained by the equation (22) in the step of discriminating and separating the grain and edges. If the color correlation is strong, the color correlation component $C_{RGB}(x,y)$ is regarded as the black-and-white grain that is equally included in three colors. If the color correlation is weak to the contrary, the color correlation component $C_{RGB}(x,y)$ is regarded as the dye grain formed of color cloud that is included independently in the respective colors. The discrimination of the black-and-white grain and the dye grain is thus performed.

In order to calculate the color correlation, as shown in the following equation (29):

$$C_{RGB}(x,y) = \sum_{i=R,G,B} \{G_{0i}(x,y) - <G_{0i}(x,y)>\}/3 \quad (29)$$

the mean value $<G_{oi}(x,y)>$ of the grain component (data) $G_{oi}(x,y)$ in an array of n×n pixels with the pixel (x,y) being centered is first determined for each color. Next, the variation value $\Delta G_{oi}(x,y)$ is determined from the difference between the mean value $<G_{oi}(x,y)>$ and the grain data $G_{oi}(x,y)$ in each color. The sum of each variation value is regarded as the local color correlation component $G_{RGB}(x,y)$.

FIG. 5 shows schematically an exemplary two-dimensional density profile $G_{RGB}(x,y)$ expressed in the direction x of the color correlation component of RGB in an image on a silver halide film; said density profile being obtained in this step from the two-dimensional density profiles $G_{OR}(x,y)$, $G_{OG}(x,y)$, $G_{OB}(x,y)$ of the grain components of R, G and B as shown in FIGS. 4A, 4B and 4C. FIG. 5 shows clearly that, in the two-dimensional density profile $C_{RGB}(x,y)$ of the color correlation component, the black-and-white grain component which exists equally in R, G and B is extracted in three portions as a color correlative portion or a portion having a strong color correlation.

The thus obtained color correlation component $C_{RGB}(x,y)$ of the grain is normalized with a constant $C_{max}$ and multiplied by the grain components $G_{oi}(x,y)$ of R, G and B. The obtained product is regarded as the black-and-white grain components $G_{Agi}(x,y)$ formed of undeveloped silver halide silver and developed silver (see the following equation (30)). The value of the constant $C_{max}$ may be the maximal value of $C_{RGB}(x,y)$ in the total image, or a value obtained by multiplying the mean value by a constant (for example two). Alternatively, the value may be set based on the amount of the silver halide grains and developed silver grains included in the image, granularity of the original image and the degree of the sharpness enhancement. With image data of 8 bits for each color of R, G and B, values within a range of 10–100 are preferred.

$$G_{Agi}(x,y) = \{C_{RGB}(x,y)/C_{max}\} \times G_{0i}(x,y) \quad (30)$$

The black-and-white grain components $G_{Agi}(x,y)$ formed of undeveloped silver halide and developed silver include not only the black-and-white grain component $G_{0Ag}(x,y)$ which exists equally in R, G and B, but also the black-and-white (silver) grain components formed of undeveloped silver halide and developed silver which are different in each color. However, as is clear from FIGS. 4A, 4B, 4C and 5, the color correlation component $C_{RGB}(x,y)$ itself essentially takes larger values in portions having a stronger correlation between the grain components $G_{OR}(x,y)$, $G_{OG}(x,y)$ and $G_{OB}(x,y)$ and smaller values in portions having no correlation, and has a property such that the value is regarded as approximately zero. Therefore, the black-and-white grain components $G_{Agi}(x,y)$ have small fluctuations in each color of R, G and B, and can be regarded as the black-and-white grain component $G_{0Ag}(x,y)$ which exists equally in R, G and B. Then, the relation can be expressed as follows:

$$G_{0AG}(x,y) \approx G_{AgR}(x,y) \approx G_{AgG}(x,y) \approx G_{AgB}(x,y) \approx G_{Agi}(x,y)$$

Further, more specifically, the grain components $G_{0i}(x,y)$ of R, G and B are composed of the black-and-white grain component $G_{0Ag}(x,y)$ which exists equally in R, G and B and the dye grain components $G_{Dyei}(x,y)$ for each color of R, G and B, and are expressed by the following equation (31a):

$$G_{0i}(x,y) = G_{0Ag}(x,y) + G_{0Dyei}(x,y) \quad (31a)$$

Especially, in a portion where the black-and-white grain component takes a larger value, the relation is expressed as follows: $G_{0Ag}(x,y) >> G_{0Dyei}(x,y)$ and the color correlation coeffieicnt $C_{RGB}(x,y)$ is larger. Then, $G_{0i}(x,y)$ can be approximated to $G_{0Ag}(x,y)$:

$$G_{0i}(x,y) \approx G_{0Ag}(x,y) \quad (31b)$$

$G_{0i}(x,y)$ can be regarded as common to R, G and B. Since $G_{RGB}(x,y)/C_{max}$ can be approximated to 1, $G_{Agi}(x,y)$ in the equation (30) can be regarded as $G_{0Ag}(x,y)$, hence as common to R, G and B.

Further, in a portion where the black-and-white grain component takes a smaller value in the equation (31a), the relation is expressed as follows: $G_{0Ag}(x,y) << G_{0Dyei}(x,y)$. Then, $G_{0i}(x,y)$ can be approximated to $G_{0Dyei}(x,y)$:

$$G_{0i}(x,y) \approx G_{0Dyei}(x,y) \tag{31c}$$

The dye grain components of R, G and B are dominant, but the color correlation coefficient $C_{RGB}(x,y)$ is smaller. Then, $G_{Agi}(x,y)$ in the equation (30) takes a smaller value, and, for example, $G_{RGB}(x,y)/C_{max}$ can be approximated to 0. Thus, $G_{Agi}(x,y)$ and $G_{0Ag}(x,y)$ can be both regarded as 0 in, each of R, G and B.

In the above description, the black-and-white grain component which exists equally in R, G and B, the dye grain component for each color of R, G and B, and the black-and-white grain components $G_{Agi}(x,y)$ formed of undeveloped silver halide and developed silver are strictly expressed by $G_{0AG}(x,y)$, $G_{0Dyei}(x,y)$ and $G_{Agi}(x,y)$, respectively. However, the black-and-white grain component $G_{Agi}(x,y)$ obtained by the equation (30) can be regarded as the black-and-white grain component $G_{0Ag}(x,y)$ which exists equally in R, G and B. Then, in the following description, these are expressed by $G_{Ag}(x,y)$. Any one of the black-and-white grain components $G_{Agi}(x,y)$ obtained by the equation (30) or the mean of $G_{Agi}(x,y)$ (i=R, G or B) may of course be used as the black-and-white grain component $G_{Ag}(x,y)$.

The dye grain component $G_{Dyei}(x,y)$ where "i" is R, G or B, is determined by subtracting the black-and-white grain component $G_{AG}(x,y)$ from the grain component $G_0(x,y)$ for each color, as expressed by the following equation (31):

$$G_{Dyei}(x,y) = G_{0i}(x,y) - G_{Ag}(x,y) \tag{31}$$

An example of the two-dimensional density profile $G_{AG}(x,y)$ of the black-and-white grain component formed of silver grains including undeveloped silver halide grains and developed silver grains, as well as an example each of the two-dimensional density profiles $G_{DyeR}(x,y)$, $G_{DyeG}(x,y)$ and $G_{DyeB}(x,y)$ of the dye grain component formed of dye cloud in an image of a silver halide film are schematically shown in FIGS. 6, 7A, 7B and 7C, respectively. The above density profiles expressed in the direction x were obtained in this step by discriminating and separating from the two-dimensional density profiles $G_{0R}(x,y)$, $G_{0G}(x,y)$ and $G_{0B}(x,y)$ of the grain components of R, G, B shown in FIGS. 4A, 4B and 4C, by means of the two-dimensional density profile $G_{RGB}(x,y)$ of the color correlation component of RGB shown in FIG. 5. It should be noted that FIG. 6 shows only one density profile as a typical example, since the black-and-white grain components $G_{Agi}(x,y)$ of the respective colors are almost identical.

FIGS. 6, 7A, 7B and 7C clearly show that, in the two-dimensional density profile $G_{Ag}(x,y)$ of the black-and-white grain component, the black-and-white (silver) grain component which exists equally in R, G and B is extracted in three portions, and that, in the two-dimensional density profiles $G_{DyeR}(x,y)$, $G_{DyeG}(x,y)$, $G_{DyeB}(x,y)$ of the dye grain component, a portion having a weak or no color correlation is only extracted. In the following description, the suffix "i" (=R, G, B) is omitted for the sake of simplification unless particular distinction is required.

8) We now describe the step of calculating the suppressing components of the black-and-white grain and the dye grain.

The black-and-white grain component $G_{Ag}(x,y)$ represented by $G_{Agi}(x,y)$ obtained by the above equation (30) is multiplied by the suppressing constant $\alpha_{Ag}$ to obtain the black-and-white grain suppressing component $G_{Ag}(x,y)'$. On the other hand, the dye grain component $G_{Dye}(x,y)$ obtained by the above equation (31) is multiplied by the suppressing constant $\alpha_{Dye}$ to obtain the dye grain suppressing component $G_{Dye}(x,y)'$.

$$G_{Ag}(x,y)' = \alpha_{Ag} \times G_{Ag}(x,y)$$
$$G_{Dye}(x,y)' = \alpha_{Dye} \times G_{Dye}(x,y) \tag{32}$$

9) We finally describe the step of suppressing graininess from the sharpness enhanced image, or step of creating the finally processed image with suppressed graininess and enhanced sharpness.

The black-and-white grain suppressing component $G_{Ag}(x,y)'$ and the dye grain suppressing component $G_{Dye}(x,y)'$ are subtracted from the sharpness enhanced image data $I_S(x,y)$ obtained by the equation (1) in the sharpness enhancing step to remove selectively the black-and-white grain suppressing component and the dye grain suppressing component from the grainy region of the sharpness enhanced image Is, whereupon the sharpness enhanced image with suppressed graininess can be obtained.

$$I_1(x,y) = I_S(x,y) - G_{Ag}(x,y)' - G_{Dye}(x,y)' \tag{33}$$

Thus, the finally processed image $I_0(x,y)$ in which noise including graininess is suppressed and sharpness is sufficiently enhanced can be obtained from the original image $I_0(x,y)$.

The image processing method according to the first embodiment of the present invention and the image processing apparatus for implementing this method are basically constructed as described above.

Figure 8:
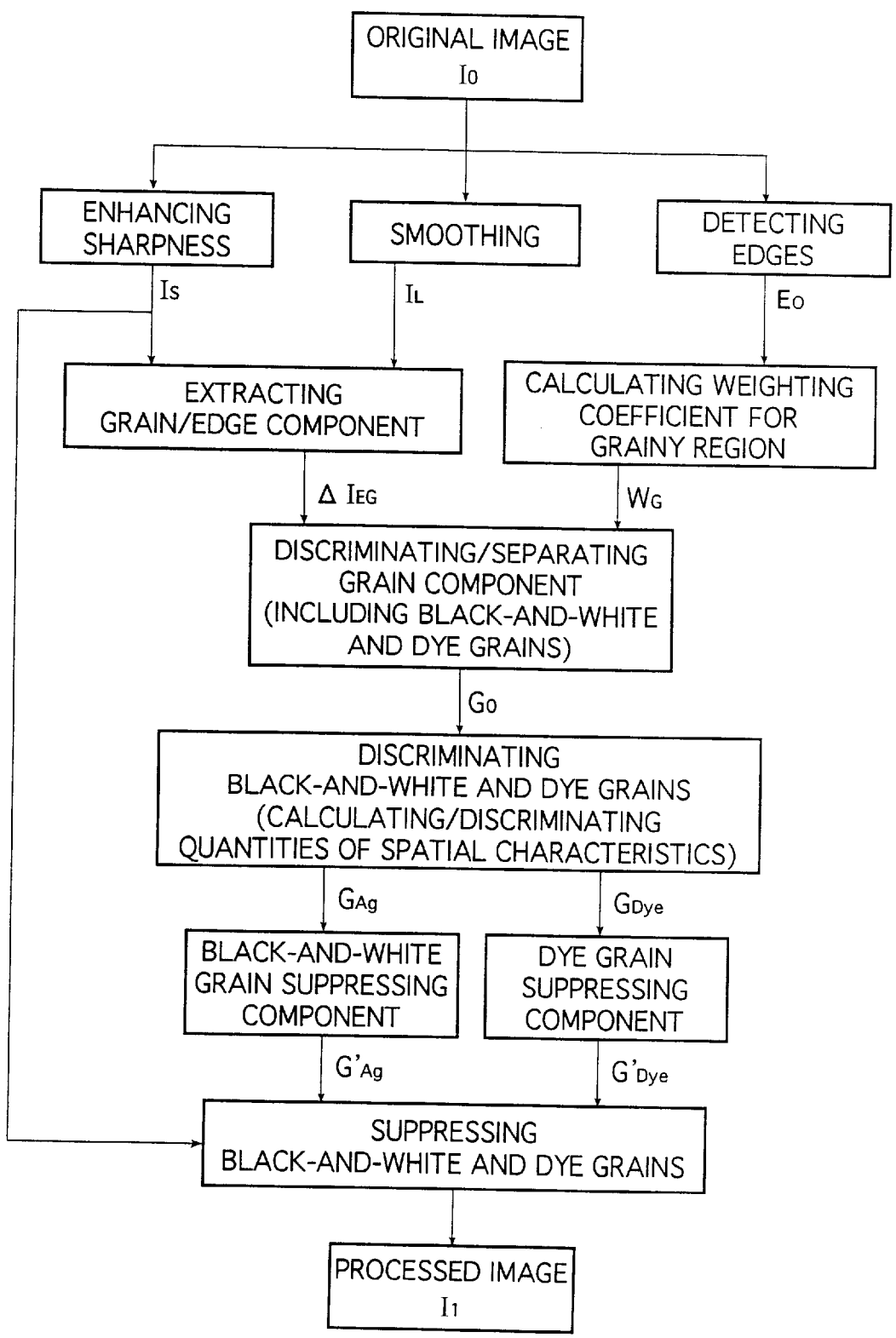
FIG. 8 is a flowchart showing another embodiment of the image processing method of the invention to enhance sharpness while suppressing graininess.

We now describe in detail an image processing method according to the second embodiment of the invention and an image processing apparatus for implementing this method with reference to FIGS. 1, 2 and 8. First, we describe below in detail the operation of the image processing section 20 and the image processing method according to the second embodiment of the invention with reference to FIG. 8 which shows a flowchart for a processing algorithm in the image processing method according to the second embodiment of the invention. FIG. 8 showing the flowchart for the processing algorithm in the image processing method according to the second embodiment of the invention has the same layout as FIG. 3 showing the flowchart for the processing algorithm in the image processing method according to the first embodiment of the invention except that different methods for discrimination and separation are applied to the step of discriminating the black-and-white grain and the dye grain. Therefore, detailed description will not be given as to the identical steps other than the step of discriminating the black-and-white grain and the dye grain.

Also in this embodiment, as shown in FIGS. 2 and 8, a sharpness enhanced image $I_S$ and a smoothed image $I_L$ are first created from the original image $I_0$ for each color and each pixel in the sharpness enhancing subsection 24 and the smoothing subsection 26, respectively, and fine image data $\Delta I_{EG}$ in which both edges and grain (noise) exist is extracted in the edge/grain component extracting subsection 28, as in the first embodiment shown in FIG. 3.

On the other hand, as in the first embodiment, an edge component $E_0$ as the edge image data of the subject in the image is detected from the original image $I_0$ in the edge detecting subsection 30 by a local variance or another method, and weighting data for the grainy region $W_G(x,y)$ is determined from the edge component $E_0$ in the weighting coefficient calculating subsection for grainy region 32.

In this embodiment, the weighting coefficient data for the grainy region $W_G(x,y)$ obtained in the weighting coefficient calculating subsection for grainy region 32 is first used in the processing subsection for discriminating grain component 34 to discriminate the edge component $E_o$ in the edge region and the grain component $G_o$ in the grainy region from the edge/grain containing fine image data $\Delta I_{EG}(x,y)$ previously determined in the edge/grain component extracting subsection 28. The grain component $G_o$ is separated and extracted for each color of R, G and B.

The grain component $G_o$ includes the black-and-white grain component formed of silver grains such as undeveloped silver halide grains and developed silver grains and the dye grain component. Then, the morphologic features of the black-and-white grain and the dye grain in the grain component $G_o$ are further expressed by numerical values to determine a local grain coefficient $G_L(x,y)$. The black-and-white grain component $G_{Ag}$ formed of silver grains and the dye grain component $G_{Dye}$ are discriminated and separated based on the thus obtained local grain coefficient $G_L(x,y)$. Subsequently, the black-and-white grain component $G_{Ag}$ and the dye grain component $G_{Dye}$ are multiplied by their respective suppressing coefficients $\alpha_{Ag}$ and $\alpha_{Dye}$ to determine a black-and-white grain suppressing component $G'_{Ag}$ and a dye grain suppressing component $G'_{Dye}$.

Finally, as in the first embodiment, the output image calculating subsection 36 subtracts the black-and-white grain suppressing component $G'_{Ag}$ and the dye grain suppressing component $G'_{Dye}$ from the sharpness enhanced image data $I_S$ created in the sharpness enhancing subsection 24, whereupon finally processed image $I_1$ with graininess being suppressed and sharpness in the edge region of the image being enhanced can be created as output image data for outputting into the image output apparatus 16.

According to the most characterizing part of the second embodiment of the invention, i) first, the sharpness enhanced image and the smoothed image are created from the original image, and the edge/grain containing image data is created (the same process as in the first embodiment);
ii) the weighting coefficient for the grainy region as calculated from the edge image data separately obtained from the original image by a local variance method or the like is used to discriminate the edge component and the grain component from the edge/grain containing image data and extract the grain component (the same process as in the first embodiment);
iii) the morphologic features of the black-and-white grain and the dye grain in the grain component are further expressed by numerical values, based on which the black-and-white grain component formed of silver halide grains and developed silver grains and the dye grain component are discriminated and separated;
iii) the black-and-white grain component and the dye grain component are multiplied by their respective suppressing coefficients to remove selectively these suppressing components from the sharpness enhanced image, thereby suppressing the graininess of the grainy region. Here, the image component in the edge region is retained without being suppressed. Therefore, graininess suppression and sharpness enhancement can be performed simultaneously.

Then, the individual steps in the image processing method of the invention will be described below briefly with reference to FIGS. 2 and 8:

1) Sharpness enhancing step by sharpness enhancing subsection 24:
2) Step of extracting edge/grain component by edge/grain component extracting subsection 28:
3) Step of calculating weighting coefficients for edge and flat regions by weighting coefficient calculating subsection for grainy region 32:
4) Step of discriminating and separating edges and grain by processing subsection for discriminating grain component 34:

The respective steps 1)–4) described above are the same as those in the first embodiment shown in FIG. 3 and the description will not be given.

5) Step of discriminating and separating black-and-white grain component and dye grain component by processing subsection for discriminating grain component 34:

The difference in signal variation (spatial magnitude and variation magnitude in density variation) due to a morphological difference between the black-and-white grain component formed of silver halide grains and developed silver grains, and the dye grain component formed of dye cloud is used to discriminate and separate the black-and-white grain component $G_{Ag}$ and the dye grain component $G_{Dye}$ from the grain components $G_o$ of R, G and B.

6) Step of calculating suppressing components of black-and-white grain and dye grain by processing subsection for discriminating grain component 34:
7) Step of suppressing black-and-white grain and dye grain from sharpness enhanced image or calculating finally processed image by output image calculating subsection 36:

The two steps 6) and 7) are also the same as those in the first embodiment shown in FIG. 3. Therefore, the description will not be given.

Also in the second embodiment of the invention, the above-mentioned image processing steps enable sharpness enhancement in the edge region of the image and graininess suppression in the flat region thereof as in the first embodiment. It should be noted that setting of parameters in the image processing algorithm in this embodiment, implementation of the algorithm itself, images to be processed in the image processing method and apparatus according to this embodiment, as well as noises to be suppressed are the same as in the first embodiment. Then, the description will not be given.

Next, the individual steps in the image processing method according to the second embodiment of the invention will be described in detail.

It should be noted that the description will not be given as to 1) step of sharpness enhancement, 2) smoothing step, 3) step of extracting a component containing both the grain and edges, 4) step of detecting edges, 5) step of calculating weighting coefficients for the edge and grainy regions by edge detection and 6) step of discriminating and separating the grain and edges, since these steps are the same as those in the first embodiment shown in FIG. 3.

7) We now describe the step of discriminating and separating the black-and-white (silver) grain component and the dye grain component.

The black-and-white grain component formed of silver halide and developed silver is spatially finer than the dye grain component, and has a large density variation because the developed silver is particularly opaque. Further, the black-and-white grain component formed of silver halide and developed silver is included as a common component in the image/grain signals of the respective colors of R, G and B as scanned with the scanner, because the spectral density distribution of the silver image is approximately flat.

On the other hand, the dye grain component is formed of semitransparent dye cloud that is generated by largely expanding from the center where developed silver grain is located. The density of the dye cloud is higher in the center and becomes lower toward the periphery thereof. Therefore, the dye grain component is spatially larger than the black-and-white grain component in terms of the grainy pattern, but has in general a smaller density variation than the black-and-white grain component.

The present invention makes use of these features of the two components to express the spatial magnitude and variation magnitude in the density variation by numerical values. The black-and-white grain component and the dye grain component can be thus discriminated based on the obtained numerical values.

In the present invention, the method of expressing the spatial magnitude and variation magnitude in the density variation by numerical values is not limited in any particular way, and the local grain coefficient $G_L(x,y)$ as expressed by the following equation (34):

$$G_L(x,y)=[S_1(x,y)+S_2(x,y)]/2 \qquad (34)$$

is advantageously determined from an array of n×n pixels with the pixel (x,y) being centered, where n is on the order of 3, 5 or 7, provided that $S_1(x,y)$ and $S_2(x,y)$ are numerical values characterizing the local density variation due to graininess as expressed by the following equations (35) and (36):

$$S_1(x, y) = \left\{ (1/n^2) \sum_{i=-(n-1)/2}^{(n-1)/2} \sum_{j=-(n-1)/2}^{(n-1)/2} [G_0(x+i, y+j) - <G_0(x, y)>]^2 \right\}^{1/2} \qquad (35)$$

$$S_2(x, y) = \left\{ (1/n^2) \sum_{i=-(n-1)/2}^{(n-1)/2} \sum_{j=-(n-1)/2}^{(n-1)/2} [G_0(x+i, y+j) - G_0(x, y)]^2 \right\}^{1/2} \qquad (36)$$

$S_1(x,y)$ expressed by the above equation (35) represents the magnitude in the density variation of the grain from the mean value of the array of n×n pixels. $S_2(x,y)$ expressed by the above equation (36) represents the density gradient between the center pixel and the surrounding pixels. Both the equations take larger values when the spatially fine density variation is larger as in the black-and-white grain component, but take smaller values when the density variation is more moderate as in the dye grain component. Therefore, the proportion of the black-and-white grain component is higher in portions where the local grain coefficient $G_L(x,y)$ takes larger values, whereas that of the dye grain component is higher in portions where the local grain coefficient $G_L(x,y)$ takes smaller values. Then, the two components can be discriminated and separated.

It should be noted that the density gradient between the surrounding pixels $S_3(x,y)$ expressed by the following equation (37):

$$S_3(x, y) = \{(G_0(x, y+1) - G_0(x-1, y+1))^2 + \qquad (37)$$
$$(G_0(x+1, y+1) - G_0(x, y+1))^2 +$$
$$(G_0(x+1, y) - G_0(x+1, y+1))^2 +$$
$$(G_0(x+1, y-1) - G_0(x+1, y))^2 +$$
$$(G_0(x, y-1) - G_0(x+1, y-1))^2 +$$
$$(G_0(x-1, y-1) - G_0(x, y-1))^2 +$$
$$(G_0(x-1, y) - G_0(x-1, y-1))^2 +$$
$$(G_0(x-1, y+1) - G_0(x-1, y))^2\}^{1/2}/8$$

may be further added to the local grain coefficient $G_L(x,y)$ expressed by the above equation (34). Then, the above equation (34) is expressed by the following equation (38):

$$G_L(x,y)=[S_1(x,y)+S_2(x,y)+S_3(x,y)]/3 \qquad (38)$$

The black-and-white grain component $G_{AG}(x,y)$ and the dye grain component $G_{Dye}(x,y)$ can be determined from the thus obtained local grain coefficient $G_L(x,y)$ and the previously obtained grain component $G_0(x,y)$ by using the following equations (39) and (40):

$$G_{Ag}(x,y)=G_0(x,y) \times G_L(x,y)/G_{Lmax} \qquad (39)$$

$$G_{Dye}(x,y)=G_0(x,y)31\ G_{Ag}(x,y) \qquad (40)$$

In the above equation, the value of $G_{Lmax}$ may be the maximal value of $G_L(x,y)$ in the total image, or a value obtained by multiplying the mean value by a constant (for example two). Alternatively, the value may be set based on the amount of the silver halide grains and developed silver grains included in the image, granularity of the original image and the degree of the sharpness enhancement. With image data of 8 bits for each color of R, G and B, values within a range of 10–100 are preferred.

8) We now describe the step of calculating the suppressing components of the black-and-white grain and the dye grain.

As in the first embodiment of the invention, the black-and-white grain component $G_{Ag}(x,y)$ obtained by the above equation (39) is multiplied by the suppressing constant $\alpha_{Ag}$ to obtain the black-and-white grain suppressing component $G_{Ag}(x,y)'$ and, the dye grain component $G_{Dye}(x,y)$ obtained by the above equation (40) is multiplied by the suppressing constant $\alpha_{Dye}$ to obtain the dye grain suppressing component $G_{Dye}(x,y)'$, as expressed by the above equation (32).

$$G_{Ag}(x,y)'=\alpha_{Ag} \times G_{Ag}(x,y)$$
$$G_{Dye}(x,y)'=\alpha_{Dye} \times G_{Dye}(x,y) \qquad (32)$$

9) We finally describe the step of suppressing graininess from the sharpness enhanced image, or step of creating the finally processed image with suppressed graininess and enhanced sharpness.

As in the first embodiment of the invention, the black-and-white grain suppressing component $G_{Ag}(x,y)'$ and the dye grain suppressing component $G_{Dye}(x,y)'$ are subtracted as expressed by the above equation (33) from the sharpness enhanced image data $I_S(x,y)$ obtained by the equation (1) to thereby remove selectively the black-and-white grain suppressing component and the dye grain suppressing component from the grainy region of the sharpness enhanced image $I_s$, whereupon the sharpness enhanced image with suppressed graininess can be obtained.

$$I_1(x,y)=I_S(x,y)-G_{Ag}(x,y)'-G_{Dye}(x,y)' \qquad (33)$$

Thus, the finally processed image $I_1(x,y)$ in which noise including graininess is suppressed and sharpness is sufficiently enhanced can be obtained from the original image $I_0(x,y)$.

The image processing method according to the second embodiment of the invention and the image processing apparatus for implementing this method are basically constructed as described above.

The method and apparatus of the invention for processing digital images to suppress their noise and enhance their sharpness were embodied for various original images.

The photographic materials described in Examples 1–5 of EP-A-800,114 were used to form images according to the image forming method described therein. To this image processing, the image processing apparatus shown in FIGS. 1 and 2 was added, and the image processing methods for graininess suppression and sharpness enhancement according to the first and second embodiments shown in FIG. 3 and FIG. 8, respectively, were applied. Consequently, images having suppressed graininess and significantly improved sharpness were also obtained.

When the image processing methods according to the first and second embodiments of the invention were applied to photographic images recorded on common silver halide color photographic materials without undeveloped silver halide grains or developed silver grains, that is, color negative or reversal films [35-mm films, brownie type films, APS (advanced photo system), films with lens (LF) and instant photography], both graininess and sharpness were improved to produce readily appreciable effects.

As for graininess in particular, the invention had a processing effect that is comparable to the improvement in graininess achieved by refining the silver halide color photographic materials. Then, there is not any visual unnaturalness and oddities due to "blurry grain" which were defects of the various prior art methods of removing graininess based on an averaging process or the reduction of fluctuations. As for image sharpness, the combination with the above-described process of graininess suppression was effective in producing a significantly greater enhancing effect than the conventional unsharp masking and Laplacian filtering.

In the above-mentioned first embodiment, the flat region which was discriminated and separated from the sharpness enhanced image together with the edge region is regarded as the grainy region or noise region. The black-and-white noise component including the black-and-white grain component formed of silver grains which exists equally in the grain components of R, G and B and which has a (strong) color correlation, and the color noise component including the dye grain component formed of dye cloud which has a weak or no color correlation are discriminated and separated from the noise component which exists in the flat region regarded as the noise region. Then, the black-and-white noise component and the color noise component are suppressed selectively. Noise suppression such as graininess suppression is not performed in the edge region. However, this is not the sole case of the invention, and the black-and-white noise component and the color noise component may be suppressed selectively even in the edge region, after having been discriminated and separated from the noise component superimposed on the image edge. However, the edge image in the edge region has a strong color correlation unlike the flat region. Then, it is difficult to discriminate in the edge region the black-and-white noise component including the black-and-white grain component formed of silver grains such as undeveloped silver halide grains and developed silver grains, and the color noise component including the dye grain component formed of dye cloud.

In the above-mentioned second embodiment, the flat region which was discriminated and separated from the sharpness enhanced image together with the edge region is regarded as the grainy region. The black-and-white grain component formed of silver grains such as silver halide grains and developed silver grains, and the dye grain component formed of dye cloud are discriminated and separated from the grain component which exists in the flat region. Then, the black-and-white grain component and the dye grain component are suppressed selectively. Noise suppression such as graininess suppression is not performed in the edge region. However, this is not the sole case of the invention, and the black-and-white grain component and the dye grain component may be suppressed selectively even in the edge region, after having been discriminated and separated from the grain component superimposed on the image edge. However, the edge image in the edge region has a strong color correlation unlike the flat region, and the difference in the morphological features between the black-and-white grain and the dye grain is not distinguishable. Then, it is difficult to discriminate in the edge region the black-and-white grain component formed of silver grains such as undeveloped silver halide grains and developed silver grains and the dye grain component formed of dye cloud.

Further, in the image on a silver halide color photographic material, the silver edge image in the edge region forms also the grain at the same time, but in many cases, need not be suppressed as in the silver grain, since the silver edge image forms mainly an image together with the dye edge image. Instead, the silver edge image in the edge region often exhibits an effect of enhancing the edges or contour of the image as in the black plate of the printed image. Then, in some cases, it is preferred to retain the silver edge image positively. If the silver edge image in the edge region is retained without being suppressed in an original image having edges or contour of a color object, black edges or contour remains on the edges or contour of the color object, which makes the image unpreferred.

Therefore, it is preferred in general not to remove but to retain the black-and-white image formed of undeveloped silver halide grains and developed silver grains in the edge region in order to improve image quality. It is further preferred to determine appropriately in accordance with the image pattern of the original image whether the black-and-white image formed of undeveloped silver halide grains and developed silver grains should be removed or retained.

The foregoing description was directed to the case where undeveloped silver halide grains as well as developed silver grains remain in an image carried on a silver halide color photographic material, especially a photographic material as described in EP-A-800,114. The invention is not however limited to this case, and the photographic material may be, for example, subjected to processing for rendering the material transparent by means of a silver halide solvent, as exemplified by processing with a drying/fixing unit described in JP-A 8-89977 so that the contribution of the undeveloped silver halide grains to the black-and-white grain component can be reduced. In this case, the black-and-white grain component is substantially composed of developed silver grains. Of course, the processing for rendering transparent the remaining undeveloped silver halide may or may not be performed in the present invention.

As described above in detail, according to the image processing method and apparatus of the invention, the noise component including graininess and the subject component of the image are simultaneously refined by sharpness enhancement. The noise including graininess is suppressed by a method in which the noise component including graininess is subtracted from the sharpness enhanced image. Hence, the noise or graininess achieved by this technique is spatially finer and lower in density contrast than it initially was. Since the noise including graininess is refined spatially, it can be as fine as is achieved when fine-grain emulsions are used to process silver halide color photographic materials.

In the conventional image processing methods, the following defects have been encountered: the graininess is enhanced to produce a visually unpleasing impression; low-contrast image signals are mistaken for graininess and suppressed or entirely eliminated; and the boundary between a region from which graininess has been removed and a region where sharpness enhancement has been done becomes discontinuous to produce unnatural artifacts in the output image. When applying the present invention to a digitized image obtained from an image on a silver halide color photographic material, especially a photographic material including not only dyes but also undeveloped silver halide grains and developed silver grains, an image having suppressed graininess and significantly enhanced sharpness can be obtained without causing any of the defects described above.

Further, according to the invention, since the noise including graininess is enhanced in sharpness and refined spatially, the grain ultimately obtained is as fine as can be produced when using fine-grain emulsions in silver halide color photographic materials and a natural grain suppressing effect is achieved without causing any visual oddities or unpleasing sensation such as "blurry graininess" which is caused in the prior art using a smoothing technique.

Further, when the present invention is applied to an image shot with a digital still camera or the like, noise or artifact having a color correlation between R, G and B, namely a fixed pattern noise of imaging device (CCD or MOS type) and noise or artifact having a color correlation between R, G and B as in moire due to aliasing as well as random noise such as photon noise or thermal noise as in an electronic circuit can be discriminated and separated. They can be removed or suppressed to achieve improvement in image quality.

While the method and apparatus of the invention for processing digital images to suppress their noise and enhance their sharpness have been described above in detail with reference to two specific embodiments, the invention is by no means limited thereto and various improvements and design modifications can of course be made without departing from the scope and spirit of the invention.

What is claimed is:

1. A method of processing a digital image for noise suppression and sharpness enhancement, comprising the steps of:
   performing a sharpness enhancing process on original image data of an original image to create sharpness enhanced image data in which an image and a noise included therein are both sharpened;
   performing a smoothing process on said original image data to create smoothed image data;
   subtracting the smoothed image data from said sharpness enhanced image data to create image data containing subject image edges and the noise of which the sharpness enhancement is achieved;
   performing an edge detection from said original image data to determine weighting data for an edge region and weighting data for a noise region used to discriminate the edge region of a subject and the noise region;
   multiplying said image data containing the subject image edges and the noise by said weighting data for the noise region to determine noise data of each color in the noise region;
   determining a black-and-white noise component and a color noise component from the noise data of said each color;
   multiplying the thus obtained black-and-white noise component and color noise component by their suppressing coefficients to determine a black-and-white noise suppressing component and a color noise suppressing component; and
   selectively removing said black-and-white noise suppressing component and said color noise suppressing component from said sharpness enhanced image data, thereby creating a processed image in which the noise suppression is achieved while retaining the sharpness enhancement in the edge region of the image.

2. The method according to claim 1, wherein said black-and-white noise component and said color noise component are respectively determined as a component which exists equally in said each color and as a component which exists independently in said each color, based on a color correlation component obtained by calculating a color correlation of the noise data of said each color in said noise region.

3. The method according to claim 1, wherein said weighting data for the noise region is determined from said weighting data for the edge region.

4. The method according to claim 1, wherein said noise includes graininess, and said noise region, said black-and-white noise component and said color noise component are a grainy region, a black-and-white grain component and a dye grain component, respectively.

5. The method according to claim 4, wherein said original image is an image recorded a silver halide color photographic material and wherein said black-and-white grain component includes at least one of undeveloped silver halide grains and developed silver grains.

6. The method according to claim 1, wherein said original image data is image data captured with an image pickup device from an image recorded on a silver halide color photographic material, and wherein said black-and-white noise component includes not only a black-and-white grain component formed of at least one of undeveloped silver halide grains and developed silver grains, but also at least one of a random noise of said each color, a fixed pattern noise of said image pickup device and moire due to aliasing.

7. The method according to claim 2, wherein said original image is an image recorded with an image pickup device, and wherein said black-and-white noise component is a noise which is strong in said color correlation and which includes at least one of a random noise of said each color, a fixed pattern noise of said image pickup device and moire due to aliasing, whereas the color noise component is a noise which is weak in said color correlation.

8. The method according to claim 1, wherein said edge detection is performed by a local variance.

9. The method according to claim 1, wherein said sharpness enhancing process is Gaussian unsharp masking.

10. The method according to claim 1, wherein said smoothing process is Gaussian masking.

11. The method according to claim 1, wherein said sharpness enhancement is applied in a necessary and sufficiently intense manner, although graininess is considerably marked without being suppressed.

12. The method according to claim 1, wherein said noise includes graininess, and said noise region, said noise data, said black-and-white noise component, said color noise component, said black-and-white noise suppressing component and said color noise suppressing component are a grainy region, grain data, a black-and-white grain component, a dye grain component, a black-and-white grain suppressing component and a dye grain suppressing component, respectively, and wherein a local grain coefficient representing a spatial magnitude and a variation magnitude of density variations due to the graininess is determined and used to discriminate and separate said black-and-white grain component and said dye grain component from the grain data of said each color in said grainy region.

13. The method according to claim 12, wherein said original image is an image recorded on a sliver halide color photographic material, and wherein said black-and-white grain component includes at least one of undeveloped silver halide grains and developed silver grains.

14. The method according to claim 12, wherein said original image data is image data captured with an image pickup device from an image recorded on a silver halide color photographic material, and wherein said black-and-white grain component includes not only a grain component formed of at least one of undeveloped silver halide grains and developed silver grains, but also at least one of a random noise of said each color, a fixed pattern noise of said image pickup device and moire due to aliasing.

15. An apparatus for processing a digital image for noise suppression and sharpness enhancement, comprising:

a sharpness enhancing unit which performs a sharpness enhancing process on original image data of an original image to create sharpness enhanced image data in which an image and a noise included therein are both sharpened;

a smoothing unit which performs a smoothing process on said original image data to create smoothed image data;

an edge/noise component extracting unit which subtracts the smoothed image data from said sharpness enhanced image data to create image data containing subject image edges and the noise of which the sharpness enhancement is achieved;

an edge detecting unit which performs an edge detection from said original image data to determine weighting data for an edge region used to discriminate the edge region of a subject and a noise region;

a weighting coefficient calculating unit for the noise region in which weighting data for the noise region is determined from the weighting data for the edge region;

a noise component discriminating unit in which the image data containing the subject image edges and the noise is multiplied by said weighting data for the noise region to determine noise data of each color in the noise region, from which a black-and-white noise component and a color noise component are determined, after which the thus obtained black-and-white noise component and color noise component are multiplied by their suppressing coefficients to determine a black-and-white noise suppressing component and a color noise suppressing component; and an output image calculating unit which selectively removes said black-and-white noise suppressing component and said color noise suppressing component from said sharpness enhanced image data, thereby creating a processed image in which the noise suppression is achieved while retaining the sharpness enhancement in the edge region of the image.

16. The apparatus according to claim 15, wherein said noise component discriminating unit determines said black-and-white noise component which exists equally in said each color and said color noise component based on a color correlation component obtained by calculating a color correlation of the noise data of said each color in said noise region.

17. The apparatus according to claim 15, wherein said noise includes graininess, and said noise region, said noise data, said black-and-white noise component, said color noise component, said black-and-white noise suppressing component, said color noise suppressing component, said edge/noise component extracting unit, said weighting coefficient calculating unit for the noise region and said noise component discriminating unit are a grainy region, grain data, a black-and-white grain component, a dye grain component, a black-and-white grain suppressing component, a dye grain suppressing component, an edge/grain component extracting subsection, a weighting coefficient calculating subsection for the grainy region and a processing subsection for discriminating a grain component, respectively, and wherein said processing subsection for discriminating the grain component determines a local grain coefficient representing a spatial magnitude and a variation magnitude of density variations due to the graininess to discriminate and separate said black-and-white grain component and said dye grain component from the grain data of said each color in said grainy region.

* * * * *